United States Patent
Selvanesan et al.

(10) Patent No.: US 12,414,141 B2
(45) Date of Patent: *Sep. 9, 2025

(54) NR V2X RESOURCE POOL DESIGN

(71) Applicant: Fraunhofer-Gesellschaft zur Foerderung der angewandten Forschung e.V., Munich (DE)

(72) Inventors: Sarun Selvanesan, Berlin (DE); Thomas Fehrenbach, Berlin (DE); Cornelius Hellge, Berlin (DE); Roya Ebrahim Rezagah, Berlin (DE); Robin Thomas, Berlin (DE); Thomas Wirth, Berlin (DE); Thomas Schierl, Berlin (DE); Eiko Seidel, Sauerlach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,878

(22) Filed: Apr. 25, 2024

(65) Prior Publication Data
US 2025/0016810 A1    Jan. 9, 2025

Related U.S. Application Data

(63) Continuation of application No. 17/169,305, filed on Feb. 5, 2021, now Pat. No. 11,974,307, which is a (Continued)

(30) Foreign Application Priority Data

Aug. 9, 2018    (EP) ..................................... 18188370

(51) Int. Cl.
*H04W 72/53*    (2023.01)
*H04W 4/40*    (2018.01)
(Continued)

(52) U.S. Cl.
CPC ............. *H04W 72/53* (2023.01); *H04W 4/40* (2018.02); *H04W 72/02* (2013.01); *H04W 72/0446* (2013.01); *H04W 72/0453* (2013.01)

(58) Field of Classification Search
CPC ..... H04L 5/0044; H04L 5/006; H04L 5/0062; H04W 4/40; H04W 72/02; H04W 72/04;
(Continued)

(56) References Cited

U.S. PATENT DOCUMENTS 11,974,307 B2 * 4/2024 Selvanesan ....... H04W 72/0453
2016/0057798 A1   2/2016 Chae et al.
(Continued)

FOREIGN PATENT DOCUMENTS

CN    106664189 A    5/2017
CN    107211470 A    9/2017
(Continued)

OTHER PUBLICATIONS

Bonjorn, Nestor, et al., "Enhanced 5G V2X Services using Sidelink Device-to-Device Communications", Citation not provided., 8 pp.
(Continued)

*Primary Examiner* — Kashif Siddiqui
(74) *Attorney, Agent, or Firm* — Perkins Coie LLP; Michael A. Glenn

(57) ABSTRACT

In the field of wireless communication systems or networks, the design of resource pools as they may be used in sidelink communications among users of the wireless communication system, for example in V2X applications, is described. In particular, an improved resource pool design, for example for resource pools to be used in sidelink communications in V2X services in view of the advantages defined by the NR 5G standard, is presented.

14 Claims, 13 Drawing Sheets

Related U.S. Application Data continuation of application No. PCT/EP2019/071206, filed on Aug. 7, 2019.

(51) Int. Cl.
  *H04W 72/02* (2009.01)
  *H04W 72/0446* (2023.01)
  *H04W 72/0453* (2023.01)

(58) Field of Classification Search
  CPC ......... H04W 72/0446; H04W 72/0453; H04W 72/53
  See application file for complete search history.

(56) References Cited

U.S. PATENT DOCUMENTS

| | | | |
|---|---|---|---|
| 2016/0295624 A1 | 10/2016 | Novlan et al. | |
| 2017/0303240 A1 | 10/2017 | Basu Mallick et al. | |
| 2018/0049084 A1 | 2/2018 | Lee et al. | |
| 2018/0115966 A1 | 4/2018 | Chen et al. | |
| 2018/0183551 A1 | 6/2018 | Chou et al. | |
| 2018/0199343 A1 | 7/2018 | Deogun et al. | |
| 2019/0082431 A1* | 3/2019 | Yi | H04L 5/0055 |
| 2019/0103954 A1* | 4/2019 | Lee | H04L 5/0098 |
| 2020/0045569 A1* | 2/2020 | Seo | H04W 72/23 |
| 2020/0120584 A1* | 4/2020 | Yi | H04W 16/28 |
| 2020/0145156 A1* | 5/2020 | Chen | H04L 5/0064 |
| 2020/0274750 A1* | 8/2020 | Yi | H04J 11/0076 |
| 2020/0351847 A1* | 11/2020 | Kim | H04L 5/0096 |
| 2021/0212115 A1* | 7/2021 | Dong | H04W 74/085 |

FOREIGN PATENT DOCUMENTS

| | | |
|---|---|---|
| CN | 107277922 B | 6/2024 |
| KR | 20200017834 A | 2/2020 |
| WO | 2017145867 A1 | 8/2017 |

OTHER PUBLICATIONS

Hisilicon, Huawel, "Remaining issues on bandwidth part and wideband operation", 3GPP TSG RAN WG1 NR_AH_1801 R1-1800018, [online], Jan. 13, 2018, URL: https://www.3gpp.org/ftp/tsg_ran/WG1_RL1/TSGR1_AH/NR_AH_1801/Docs/R1-1800018.zip, 16 pp.

Nokia, et al., "Correction on exceptional pool's resource selection", 3GPP TSG-RAN WG2 Meeting #97 Athens, Greece R2-1702069, Feb. 2017, 4 pp.

"RE mapping for PUCCH of 1 or 2 bits", 3GPP TSG RAN WG1 Meeting 90bis, Source:: ETRI, Oct. 13, 2017, 4 pp.

"Remaining issues on bandwidth parts for NR", NTT DOCOMO et al.: 3GPP Draft; R1- 1716109, Sep. 11, 2017 (Sep. 11, 2017), XP051329303, Sep. 2017, 5pp.

* cited by examiner

NR V2X RESOURCE POOL DESIGN

CROSS-REFERENCE TO RELATED APPLICATIONS

This application is a continuation of copending U.S. patent application Ser. No. 17/169,305 filed Feb. 5, 2021, which in turn is a continuation of copending International Application No. PCT/EP2019/071206, filed Aug. 7, 2019, which is incorporated herein by reference in its entirety, and additionally claims priority from European Application No. 18188370.3, filed Aug. 9, 2018, which is also incorporated herein by reference in its entirety.

BACKGROUND OF THE INVENTION

The present invention relates to the field of wireless communication systems or networks, more specifically to the design of resource pools as they may be used in sidelink communications among users of the wireless communication system, for example in V2X applications.

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground-based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells; however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user UEs as is schematically represented by arrow $112_2$. The respective base station $gNB_1$ to $gNB_5$ may be connected to the core network 102, e.g. via the S1 or Xn interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, New Radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. The term "served by a BS" in this context means, that the UE may utilize reference symbols broadcasted by the BS, e.g. synchronization signals, to indirectly synchronize to another UE, or that the BS organizes resource sets or resource pools to be used by both UEs for direct communication for transmission and reception. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 4 configuration. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

For the communication among two or more UEs over respective sidelink interfaces a resource pool may be defined. The resource pool includes a plurality of resources that may be used by the UEs for respective transmissions and receptions over the sidelink. In accordance with a conventional approach, for example as defined in the LTE V2X standard, a resource pool is defined as a set of time and frequency resources in the uplink spectrum that are reserved to be used only for vehicular communications.

FIG. 4 illustrates an example of a resource pool which is defined across time and frequency. The top of FIG. 4 illustrates the resources in time and frequency that may be available at the base station for a communication with one or more UEs being connected to the base station. From these available resources a subset of resources is selected for defining the resource pool. As is illustrated in FIG. 4, across the time domain, the base station provides the UE with a subframe bitmap of variable lengths. The bitmap indicates whether resources at a certain time are to be used for the resource pool (indicated by a "1" in the bitmap) and which resources are not to be used for the resource pool (indicated by a "0" in the bitmap). As is indicated by the vertical dotted line in the upper part of FIG. 4, the bitmap may be repeated across the duration of the resource pool. The resource pool includes data and control sub-channels, which are defined on the basis of the subframes indicated by the bitmap and across the frequency. The data sub-channel is defined using a set of parameters that include the number of sub-channels together with a resource block, RB, index, and the size of the sub-channel in RBs. The control sub-channels are defined also on the basis of the subframes indicated in the bitmap, however, only the starting RB index is specified as the control channel extends only across two RBs in frequency. In the example of FIG. 4, one can see that from the block 310 of available resources the resource pool 312 is selected including two control sub-channels 314a and 314b as well as two data sub-channels 316a and 316b. In the example of FIG. 4, the control sub-channels are indicated by specifying the respective starting resource block in each selected subframes, namely the first and sixth RBs in each subframe with a size of 2 RBs in frequency, and the data sub-channels are described by their respective starting RBs, namely the third and eighth RBs in each subframe with a size of three RBs in frequency.

Thus, in accordance with conventional approaches, a resource pool may contain a minimum of two sub-channels, one sub-channel for control information, like the PSCCH, and one sub-channel for data, like the PSSCH. At a given transmit time interval, TTI, or subframe, a transmitting UE broadcasts a sidelink control information, SCI, in the control channel, followed by the data in the same subframe. The SCI will point to the resources within the subframe that data will be transmitted on, and a receiving UE will listen to the control sub-channel so that when it does receive an SCI it is made aware where the data is to be received.

There may be multiple resource pools in each configuration given by the BS to the UEs. Each resource pool may pertain a different purpose or situation, for example, there may be dedicated transmit resource pools, receive resource pools and so-called exceptional resource pools. When considering, for example, the case of transmit resource pools, the base station may divide its coverage area into a plurality of zones and may provide, dependent on the situations in the respective zones, different transmit resource pools for UEs located in the respective zones. For example, the base station may divide the coverage area into eight zones, and FIG. 5 is a schematic representation of a cell, like a cell in the network described above with reference to FIG. 1, in which such a division into multiple zones is applied. The cell is defined by the coverage 200 (see FIG. 3) of the base station gNB. The coverage area 200 is divided into a plurality of zones, each zone having associated therewith a respective zoneID. The coverage area 200 is subdivided into eight zones 2000 to 2007 having assigned thereto the zone identifiers zoneID0 to zoneID7. It is noted that FIG. 5 is only an example of how the coverage area 200 may be separated into the respective zones, and in accordance with other examples more or less zones and zones of other shapes may be defined. The respective zones may be defined in relation to respective latitude and longitude coordinates, and the zones may also be referred to as V2X zones for V2X communications. Each of the zones has associated therewith a singular or unique transmit resource pool as is indicated, schematically, at 312. A transmit resource pool for UEs in one zone serve as one of the many receive resource pools for UEs in other zones. The singular exceptional pool is used only during handovers from one base station gNB to another base station gNB by all UEs across zones. The resource pool 312 per zone may indicate for each of the zones the resources allocated for a sidelink communication among UEs, that are located within the zone. UEs within the same zone may have assigned thereto the respective zoneID. The resource pool 312 may indicate, for example, the frequencies/times that may be used by UEs within a given zone for a sidelink communication with other UEs. In accordance with other examples, the coverage area 200 may define a single zone. In case of flying UEs, the zone concept of longitude and latitude can be extended to 3D, e.g. using a height parameter.

Resource pools may be pre-configured in every vehicular modem, and the pre-configured resource pools may be used when the UE is out-of-coverage and has not come into coverage with a base station. In case the UE comes into coverage with the base station, the pre-configuration may be updated, and depending on the status of the UE, connected state or idle state, in or out-of-coverage, a suitable resource pool configuration may be used. FIG. 6 is a diagram illustrating a transmit pool selection for V2X communication. FIG. 6 refers in the lower part to a Mode 3 UE, and a UE is said to operate in mode 3 when the base station gNB schedules the resources to be used within a given resource pool. The UE operates in this mode when being in coverage and in an RRC_CONNECTED state. The upper part of FIG. 6 refers to a Mode 4 UE, and a UE is said to operate in mode 4 when the resource allocation is carried out in a distributed manner by the UE itself. The UE may be either in or out-of-coverage, as well as in either an RRC_CONNECTED or RRC_IDLE state to function in this mode.

A UE, when being in coverage and in an RRC_IDLE state (see block 350), receives at block 352 the SIB21, which contains the information element (IE) SL-V2X-ConfigCommon, which in turn defines the IE V2X-CommTxPoolNormalCommon. This particular IE contains the set of a maximum of 8 transmit resource pool configurations, each of which are defined by the IE SL-CommResourcePoolV2X. The UE also receives the zoneConfig IE which helps the UE in calculating its zoneID (ranges from 0 to 7), and based on the zoneID, selects the singular relevant transmission resource pool from the received set of pools. In the case where the UE does not receive the zoneConfig, it selects the first pool associated with the synchronization reference source. Similarly, when the UE moves on to the RRC_CONNECTED state (see block 354), it receives at block 356 the RRCConnectionReconfiguration message which contains the V2X-CommTxPoolNormalDedicated IE. This IE, provided by the eNB, instructs the UE (see block 358) whether it will receive the exact resources for transmission (eNB scheduled, mode 3) or it has to select its own resources for transmission based on sensing (UE-selected, mode 4). Depending on this selection, the UE is provided with a set of transmission resource pools.

In the scheduled case (see block 360), the UE is provided with the V2X-SchedulingPool IE, which contains the set of a maximum of 8 transmit resource pool configurations, each of which are defined by the SL-CommResourcePoolV2X IE. Based on the zoneConfig IE which helps the UE in selecting the singular relevant transmission resource pool from the received set of pools, the UE selects the relevant transmit resource pool and then transmits based on the resources provided by the eNB (see block 362).

In the UE-selected case, the UE is provided with the V2X-CommTxPoolNormalDedicated IE (see block 364), which then contains the set of a maximum of 8 transmit resource pool configurations, each of which are defined by the SL-CommResourcePoolV2X IE, as described above. The UE also receives the zoneConfig IE which helps the UE in selecting the singular relevant transmission resource pool from the received set of pools. The UE then transmits based on the sensed resources from the selected resource pool (see block 366).

For a UE, when being in out-of-coverage (see block 350), the resource pool is defined according to the SL-V2X-Preconfiguration (see block 368) which is used in block 366 for transmitting.

For a UE, when being in coverage but in the RRC_IDLE state (see block 354), the resource pool is selected from V2X-CommTxPoolNormalCommon defined in the SL-V2X-ConfigCommon (see block 370) which is then used in block 366 for transmitting.

Thus, in the above example, there may be a different configuration provided to a UE, and the UE selects the appropriate transmit resource pool based on the geographical location of the UE, when the coordinates correspond to a single zoneID and a resource pool ID.

The base station may decide whether to assist in the scheduling of resources or if a UE has to select the resources to be used for transmission. This defines the above-mentioned two operational modes of a V2X system, mode 3 and mode 4. As mentioned above, the V2X mode 3 configuration involves the scheduling and interference management of resource by the base station for vehicular UEs within the coverage of the base station so as to enable sidelink communications, like V2X or V2V communications. The control signaling is provided to the UE over the Uu interface, for example using the downlink control indicator, DCI, and resources are dynamically assigned by the base station. In the V2X mode 4 configuration for sidelink communications, the scheduling interference management is autonomously performed using distributed or de-centralized algorithms among the UEs based on a pre-configured resource configuration.

It is noted that the information in the above section is only for enhancing the understanding of the background of the invention and therefore it may contain information that does not form conventional technology that is already known to a person of ordinary skill in the art.

Starting from conventional technology as described above, it is an object of the present invention to provide an improved resource pool design, for example for resource pools to be used in sidelink communications in V2X services in view of the advantages defined by the NR 5G standard.

SUMMARY

An embodiment may have a transceiver for a wireless communication system, the wireless communication system configuring a set of resources in the wireless communication system, the set of resources including a plurality of resources to be allocated for respective transmissions to one or more second transceivers in the wireless communication system, wherein the set of resources includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different, and the transceiver is configured to use resources from one or more of the plurality of transmit/receive resource sets for the communication.

Another embodiment may have a transceiver for a wireless communication system, the transceiver serving a plurality of user equipments, UEs, located in a coverage area of the transceiver, wherein the transceiver configuring for the coverage area a resource set, the resource set including a plurality of resources to be allocated for respective transmissions in the wireless communication system, and a resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

According to another embodiment, a wireless communication system may have a plurality of the transceivers configured to communicate with each other, and a resource set in the wireless communication system, the resource set including a plurality of resources to be allocated for respective transmissions in the wireless communication system, and wherein the resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

Another embodiment may have a transceiver for a wireless communication system, the wireless communication system providing a resource set in the wireless communication system, the resource set including a plurality of resources to be allocated for respective transmissions in the wireless communication system, wherein the resource set includes a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different, and the transceiver is configured to use resources from one or more of the plurality of bandwidth parts for the communication.

Another embodiment may have transceiver for a wireless communication system, the transceiver for serving a plurality of user equipments, UEs, located in a coverage area of the transceiver, wherein the transceiver configures for the coverage area of the transceiver a resource set, the resource set including a plurality of resources to be allocated for respective transmissions in the wireless communication system, and the resource set includes a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

According to another embodiment, a wireless communication system may have a plurality of the transceivers configured to communicate with each other, and a resource set in the wireless communication system, the resource set including a plurality of resources to be allocated for respective transmissions in the wireless communication system, and wherein the resource set includes a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

Another embodiment may have transceiver for a wireless communication system, the wireless communication system providing a resource set in the wireless communication system, the resource set including a plurality of resources to be allocated for respective transmissions in the wireless communication system, wherein the resource set includes a plurality of subcarriers in the frequency domain, and a plurality of symbols in the time domain, the resource set being defined by a bandwidth part, the bandwidth part being equal to or is smaller than a maximal bandwidth capability supported by the transceiver, the bandwidth part includes a plurality of control resource sets, CORESETs, at least one of the CORESETs having both a transceiver-specific search space, e.g. user-specific search space, USS, and a common search space, CSS, and the transceiver is configured to use resources from the bandwidth part for the communication.

Another embodiment may have transceiver for a wireless communication system, the transceiver for serving a plurality of user equipments, UEs, located in a coverage area of the transceiver, wherein the transceiver configures for the coverage area of the transceiver a resource set, the resource set including a plurality of resources to be allocated for respective transmissions in the wireless communication system, the resource set includes a plurality of subcarriers in the frequency domain, and a plurality of symbols in the time domain, the resource set being defined by a bandwidth part, BWP, the bandwidth part being equal to or is smaller than a maximal bandwidth capability supported by the transceiver, and the bandwidth part includes a plurality of control resource sets, CORESETs, at least one of the CORESETs having both a transceiver-specific search space, e.g. user-specific search space, USS, and a common search space, CSS.

According to another embodiment, a wireless communication system may have a plurality of the transceivers configured to communicate with each other, and a resource set in the wireless communication system, the resource set including a plurality of resources to be allocated for respective transmissions in the wireless communication system, wherein the resource set includes a plurality of subcarriers in the frequency domain, and a plurality of symbols in the time domain, the resource set being defined by a bandwidth part, the bandwidth part being equal to or is smaller than a maximal bandwidth capability supported by the transceiver, and wherein the bandwidth part includes a plurality of control resource sets, CORESETs, at least one of the CORESETs having both a transceiver-specific search space, e.g. user-specific search space, USS, and a common search space, CSS.

According to another embodiment, a wireless communication network may have: one or more base stations, BS, and one or more user equipments, UEs, a UE being served by one or more BSs or communication directly with one or more other UEs while being in connected mode or idle mode or inactive mode, wherein a base station and/or a UE includes any of the inventive transceivers.

Another embodiment may have a method for transmitting/receiving for a wireless communication system, the wireless communication system configuring a set of resources in the wireless communication system, the set of resources including a plurality of resources to be allocated for respective transmissions to one or more second transceivers in the wireless communication system, wherein the set of resources includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different, and the method includes using resources from one or more of the plurality of transmit/receive resource sets for the communication.

Another embodiment may have a method for transmitting/receiving for a wireless communication system, the method serving a plurality of user equipments, UEs, located in a coverage area of a transceiver, wherein the method includes configuring for the coverage area a resource set, the resource set including a plurality of resources to be allocated for respective transmissions in the wireless communication system, and a resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

Another embodiment may have a method for transmitting/receiving for a wireless communication system, the wireless communication system providing a resource set in the wireless communication system, the resource set including a plurality of resources to be allocated for respective transmissions in the wireless communication system, wherein the resource set includes a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different, and the method includes using resources from one or more of the plurality of bandwidth parts for the communication.

Another embodiment may have a method for transmitting/receiving for a wireless communication system, the method serving a plurality of user equipments, UEs, located in a coverage area of a transceiver, wherein the method includes configuring for the coverage area of the transceiver a resource set, the resource set including a plurality of resources to be allocated for respective transmissions in the wireless communication system, and the resource set includes a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

Another embodiment may have a method for transmitting/receiving for a wireless communication system, the wireless communication system providing a resource set in the wireless communication system, the resource set including a plurality of resources to be allocated for respective transmissions in the wireless communication system, wherein the resource set includes a plurality of subcarriers in the frequency domain, and a plurality of symbols in the time domain, the resource set being defined by a bandwidth part, the bandwidth part being equal to or is smaller than a maximal bandwidth capability supported by the transceiver, the bandwidth part includes a plurality of control resource sets, CORESETs, at least one of the CORESETs having both a transceiver-specific search space, e.g. user-specific search space, USS, and a common search space, CSS, and the method includes using resources from the bandwidth part for the communication.

Another embodiment may have a method for transmitting/receiving for a wireless communication system, the method serving a plurality of user equipments, UEs, located in a coverage area of a transceiver, wherein the method includes configuring for the coverage area of the transceiver a resource set, the resource set including a plurality of resources to be allocated for respective transmissions in the wireless communication system, the resource set includes a plurality of subcarriers in the frequency domain, and a plurality of symbols in the time domain, the resource set being defined by a bandwidth part, BWP, the bandwidth part being equal to or is smaller than a maximal bandwidth capability supported by the transceiver, and the bandwidth part includes a plurality of control resource sets, CORESETs, at least one of the CORESETs having both a transceiver-specific search space, e.g. user-specific search space, USS, and a common search space, CSS.

Another embodiment may have a method for operating any of the inventive wireless communication systems.

Another embodiment may have a non-transitory computer program product including a computer readable medium storing instructions which, when executed on a computer, perform any of the inventive methods.

BRIEF DESCRIPTION OF THE DRAWINGS

Embodiments of the present invention are now described in further detail with reference to the accompanying drawings, in which.

DETAILED DESCRIPTION OF THE INVENTION

Embodiments of the present invention are now described in more detail with reference to the accompanying drawings in which the same or similar elements have the same reference signs assigned.

The above-described conventional use of resource pools has been initially introduced into the vehicle-to-everything, V2X, specification in release 14 of the 3GPP standard, and the scheduling and assigning of resources are modified according to the V2X requirements while the actual device-to-device, D2D communication standard is used as a basis for the design which is one reason for the maintaining the concept of resource pools. Resource pools were initially designed for D2D communications, bearing in mind the requirements that the resources have to be shared among D2D and cellular communications. In case of V2X communications, a dedicated intelligent transport service, ITS, band is defined that does not share the band of the cellular communications, like the 5.9 GHz band. With the introduction of the frequency range FR1 and FR2, where FR2 is defined up to 52.6 GHz, higher subcarrier spacings or sub carrier spacings, SCSs, for different numerologies may be used. The same applies to possible future frequency ranges above 52.6 GHz, e.g. 60 GHz bands, which will utilize a higher SCS.

Figure 1:
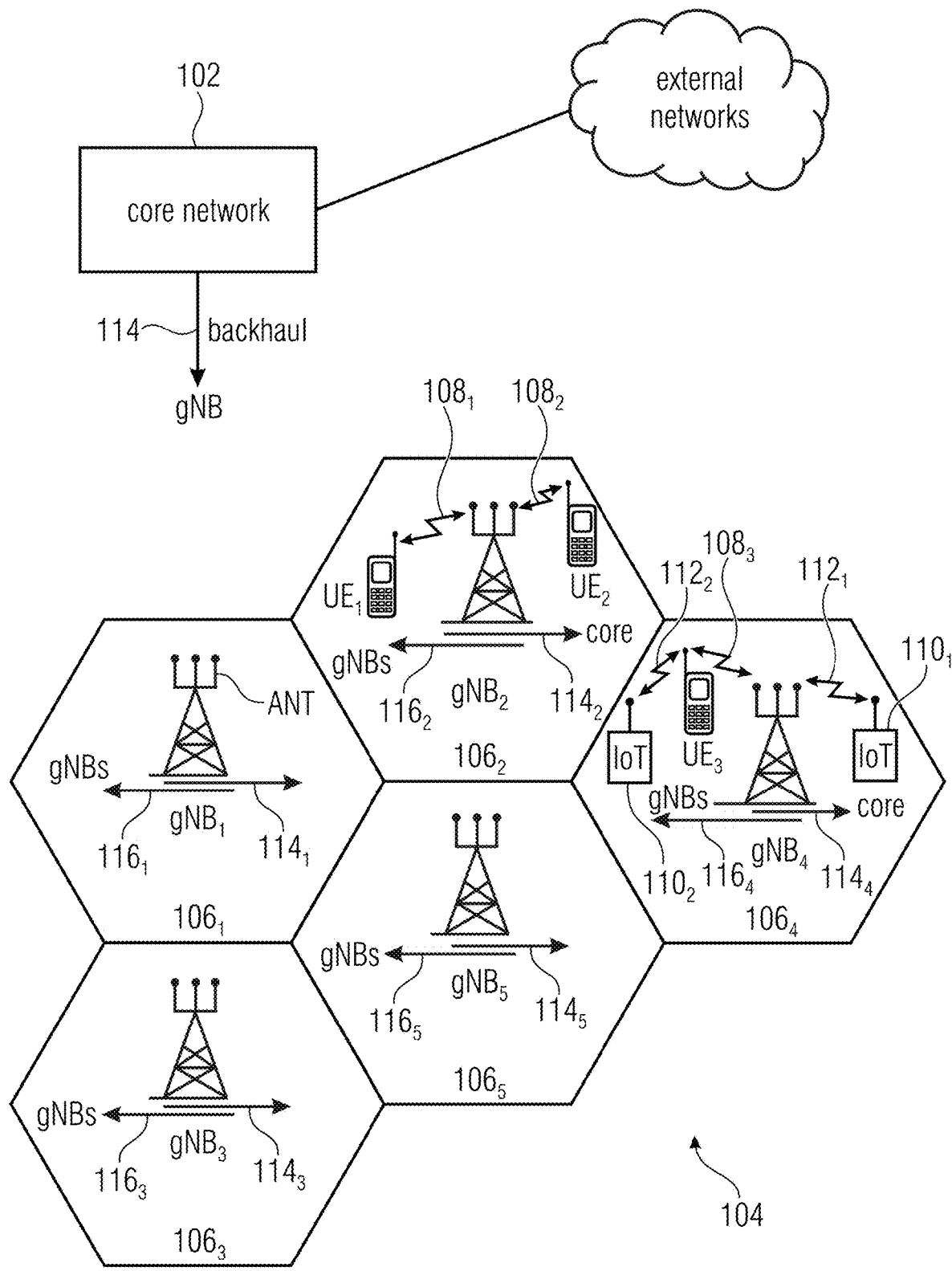
FIG. 1 shows a schematic representation of an example of a wireless communication system.
Figure 2:
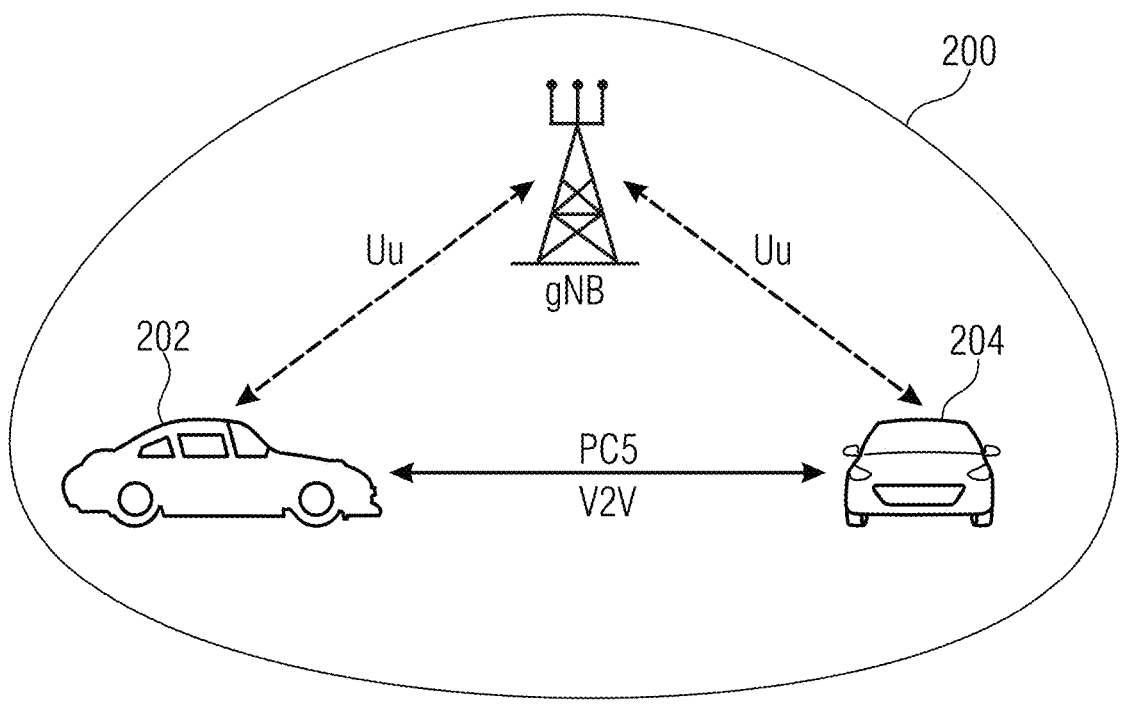
FIG. 2 shows a schematic representation of a situation in which UEs directly communicating with each other are in coverage of a base station.
Figure 3:
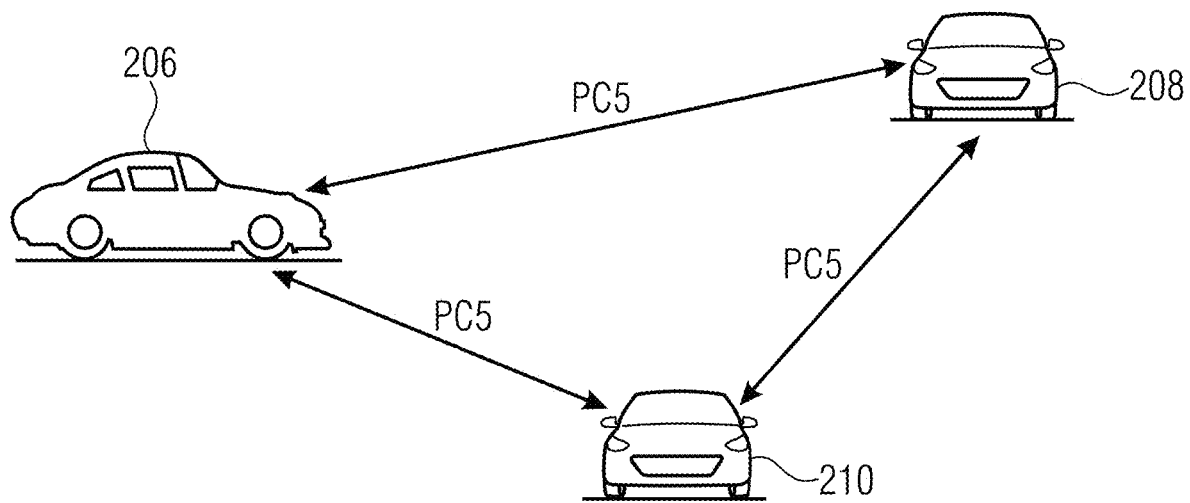
FIG. 3 shows a scenario in which UEs directly communicating with each other are not in coverage of a base station, i.e., are not connected to a base station.
Figure 7:
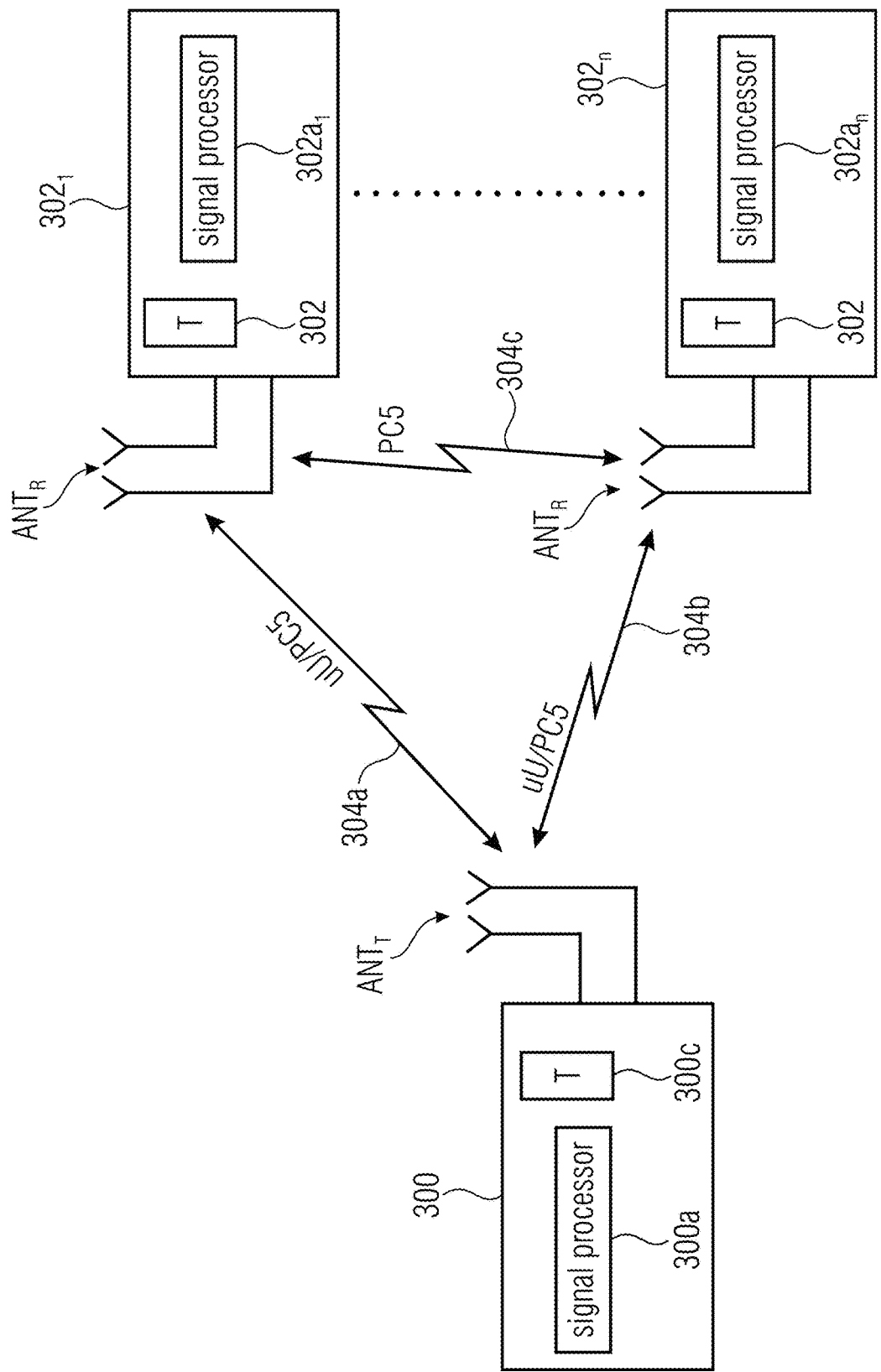
FIG. 7 is a schematic representation of a wireless communication system for communicating information between a transmitter and one or more receivers in accordance with embodiments of the present invention.

The present invention aims at improving V2X communications using the advantages provided by 5G systems. This is addressed by the present invention as described hereinbelow in more detail, and embodiments of the present invention may be implemented in a wireless communication system as depicted in FIG. 1, FIG. 2 and FIG. 3 including base stations and users, like mobile terminals or IoT devices. FIG. 7 is a schematic representation of a wireless communication system for communicating information between a transmitter 300 and one or more receivers $302_1$ to $302n$. The transmitter 300 and the receivers 302 may communicate via a wireless communication links or channels 304*a*, 304*b*, 304*c*, like a radio link. The transmitter 300 may include one or more antennas ANTT or an antenna array having a plurality of antenna elements, a signal processor 300*a* and a transceiver 300*b*, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other.

In accordance with an embodiment, as for example also depicted in FIG. 2, the transmitter 300 may be a base station and the receivers may be UEs. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface.

In accordance with an embodiment, as for example also depicted in FIG. 3, the transmitter 300 may be a first UE and the receivers may be further UEs. The first UE 300 and the further UEs 302 may communicate via respective wireless communication links 304*a* to 304*c*, like a radio link using the PC5 interface.

The system, the transmitter 300 and the one or more receivers 302 may operate in accordance with the inventive teachings described herein.

Multiple TX Resource Pools

The present invention provides a transceiver for a wireless communication system, the wireless communication system configuring a set of resources in the wireless communication system, the set of resources including a plurality of resources to be allocated for respective transmissions to one or more second transceivers in the wireless communication system, wherein
    the set of resources includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different, and
    the transceiver is configured to use resources from one or more of the plurality of transmit/receive resource sets for the communication.

In accordance with embodiments, the transceiver is configured to receive a signaling indicating an activation or deactivation of one or more of the transmit/receive resource sets, e.g., dependent on a current load of the wireless communication system or on QoS criteria, which may comprise of a load or quota and/or a delay and/or a reliability target.

In accordance with embodiments, each of the plurality of transmit/receive resource sets comprises a plurality of subcarriers in the frequency domain and a plurality of symbols in the time domain, the first property and the second property comprising a subcarrier spacing, SCS, or a symbol length, or a bandwidth.

In accordance with embodiments, each of the plurality of transmit/receive resource sets is defined by a bandwidth part, BWP, the bandwidth part being equal to or smaller than a maximal bandwidth capability supported by the transceiver.

In accordance with embodiments, the wireless communication system comprises a plurality of zones, each zone including a plurality of transmit/receive resource sets, and each zone identified by a zone ID, and In accordance with embodiments
a zone comprises a 2D or 3D area model to limit signaling overhead, or non-overlapping zones with a defined length and width and height,
a zone ID is reused in space, a total number of zones corresponds to a used number of resource sets.

In accordance with embodiments, the transceiver is configured to identify a zone associated with the transceiver using the zone ID of a zone, e.g., using a modulo operation, and to identify a transmit/receive resource set from which the resources for the communication are scheduled using the zone ID, the number of zones and a SCS index.

In accordance with embodiments, the transmit resource is identified by a NR zone ID, $$NR\ zone\ ID = zone\ ID + numZones * SCSindex$$

where
zone ID—LTE V2X zone ID,
numZones—number of zones, and
SCSindex—subcarrier spacing indicated by numerology index μ.

In accordance with embodiments, in case during an ongoing transmission the transceiver changes from a current zone to a new zone, the transceiver is configured to determine the transmit/receive resource sets for the new zone by recalculating the zone ID formula based on its new coordinates, and to request from the gNB resources to be used for transmitting the remaining amount to data, wherein the requesting may include automatically sending a buffer status report, BSR, to the gNB.

In accordance with embodiments, the transceiver is configured to transmit in the first transmit/receive resource set and to receive at the same time in the second transmit/receive resource set or transmit in a first transmit/receive resource set and to receive at a different time in a first transmit/receive resource set.

In accordance with embodiments, a control channel is defined by resources of only one of the transmit/receive resource set, the control channel including one or more pointers to data transmissions or another control channel in the plurality of transmit/receive resource sets.

In accordance with embodiments, the control channel includes an indication of an offset of subframes and/or slots in time and and/or PRBs in frequency in the respective transmit/receive resource sets.

In accordance with embodiments, the one transmit/receive resource set is selected from a plurality of resource sets having different SCSs, like 15 kHz, 30 kHz, 60 kHz, 120 kHz, and 240 kHz, wherein at least one of the resource sets provides for a backward compatibility, e.g., the 15 kHz SCS resource set providing backward compatibility with legacy LTE UEs.

In accordance with embodiments:
the transceiver comprises a user equipment, UE, the UE configured to operate in accordance with a first mode, for example the V2X Mode 3, for a sidelink communication with one or more other UEs, and
in the first mode scheduling of the resources for the sidelink communication with the one or more other UEs is performed by a base station, gNB, of the wireless communication system.

In accordance with embodiments, the transceiver comprise a user equipment, UE, the UE configured to operate in accordance with a second mode, for example the V2X Mode 4, for a sidelink communication with one or more other UEs, and to schedule resources from a transmit/receive resource set for the sidelink communication autonomously.

In accordance with embodiments, in case the UE is out of coverage of a gNB, the UE is configured to retain a last configuration of the resource set received from the gNB, or to revert to a default configuration of the resource set which is hardcoded into the UE or pre-configured by the gNB or configured by another UE via sidelink relaying.

In accordance with embodiments, a transceiver for a wireless communication system, the transceiver serving a plurality of user equipments, UEs, located in a coverage area of the transceiver, wherein
the transceiver configuring for the coverage area a resource set, the resource set including a plurality of resources to be allocated for respective transmissions in the wireless communication system, and
a resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

In accordance with embodiments, the transceiver is configured to define for the coverage area of the transceiver one or more zones, each of the one or more zones having mapped thereto a resource set including a plurality of transmit resource sets and/or receive resource sets.

The present invention provides a wireless communication system, comprising:
a plurality of the transceivers configured to communicate with each other, and
a resource set in the wireless communication system, the resource set including a plurality of resources to be allocated for respective transmissions in the wireless communication system, and
wherein the resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

Resource Pool Having Different BWPs

The present invention provides a transceiver for a wireless communication system, the wireless communication system providing a resource set in the wireless communication system, the resource set including a plurality of resources to be allocated for respective transmissions in the wireless communication system, wherein
the resource set comprises a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different, and the transceiver is configured to use resources from one or more of the plurality of bandwidth parts for the communication.

In accordance with embodiments, the transceiver is configured to receive a configuration message and/or configured by a stored pre-configuration in the out-of-coverage case, the configuration message and/or the stored pre-configuration defining the plurality of bandwidth parts across the resource set.

In accordance with embodiments, the transceiver is configured to receive a signaling indicating an activation or deactivation of one or more of the bandwidth parts, e.g., dependent on current low latency and/or high reliability and/or a given quota requirement of the wireless communication system.

In accordance with embodiments, in case only a single bandwidth part is activated, the single bandwidth part includes a control resource set, CORESET, with a transceiver-specific search space, e.g. user-specific search space, USS, and/or a CORESET with a common search space, CSS, so as to allow the transceiver to handle at the same time unicast or multicast communications and broadcast communications using the single bandwidth part.

In accordance with embodiments, the location across time and frequency of the USS and/or CSS with respect to the bandwidth part is pre-configured in the UE or is signalled by the
  gNB via RRC signalling (mode3, the UE is in coverage), or
  another UE via SCI signalling (mode4, the UE is out of coverage).

In accordance with embodiments, in case at least a first bandwidth part and a second bandwidth part are activated, the first bandwidth part includes at least a control resource set, CORESET, with a transceiver-specific search space, e.g. user-specific search space, USS, and the second bandwidth part includes at least a CORESET with a common search space, CSS, so as to allow the transceiver to handle at the same time unicast communications and broadcast communications using the first and second bandwidth parts.

In accordance with embodiments, in case at least a first bandwidth part and a second bandwidth part are activated, the first bandwidth part includes at least a control resource set, CORESET, with a transceiver-specific search space, e.g. user-specific search space, USS, and/or CORESET with a common search space, CSS, and the second BWP includes at least a control resource set, CORESET, with a transceiver-specific search space, e.g. user-specific search space, USS, and/or CORESET with a common search space, CSS, so as to allow the transceiver to handle at the same time unicast communications and broadcast communications using the first and second bandwidth parts.

In accordance with embodiments, a control channel is defined by resources of only one of the bandwidth parts.

In accordance with embodiments, the one bandwidth part has a 15 kHz SCS to provide backward compatibility with legacy LTE UEs.

In accordance with embodiments, one of the bandwidth parts is a default bandwidth part where resource allocations for one or more services are send, wherein the control resources are either configured by the wireless communication system or pre-configured in the transceiver, the default bandwidth part including at least one control resource set, CORESET, with a common search space, CSS, so as to allow the transceiver to listen to the one or more services in the transceiver's vicinity.

In accordance with embodiments, the transceiver is configured to search for synchronisation signals in the default bandwidth part, wherein, in case no synchronisation signal is found, the transceiver is configured to start transmitting a synchronisation signal and the transceiver's broadcast channel.

In accordance with embodiments, a control channel is defined by resources of the default bandwidth part, wherein transmissions in a plurality of the bandwidth parts are scheduled from the control channel in the default bandwidth part.

In accordance with embodiments, the transceiver is configured to listen only to the control channel in the default bandwidth part.

In accordance with embodiments, the control channel in the default bandwidth part points to another control channel in another bandwidth part where an actual transmission takes place, so as to make other transceivers aware that there is another bandwidth part with specific control resources that are to be monitored and/or decoded by the transceiver.

In accordance with embodiments, the control channel in the default bandwidth part points to another data channel in another bandwidth part, and wherein the transceiver automatically switches back to the default BWP, e.g., after the transmission of data, or a timeout in the second BWP, or responsive to a control signaling, like a control channel or a control element in one or more of the active BWPs.

In accordance with embodiments:
  at least one of the plurality of bandwidth parts defines a plurality of transmit resource sets within the one bandwidth part, the plurality of transmit resource sets and/or receive resource sets including at least a first transmit/receive resource set and a second transmit/receive resource set,
  the one bandwidth part includes a control resource set, CORESET, for each transmit/receive resource set for handling control messages and scheduling assignment messages, the control messages pointing to data to be transmitted inside the respective transmit/receive resource set.

In accordance with embodiments:
  the resource set includes a plurality of transmit resource sets and/or receive resource sets, the plurality of transmit/receive resource sets including at least a first transmit/receive resource set and a second transmit/receive resource set, the first transmit/receive resource set having a first subcarrier spacing, SCS, and the second transmit/receive resource set having a second SCS, the first SCS and the second SCS being different, and
  each transmit/receive resource set includes one or more of the plurality of bandwidth parts.

In accordance with embodiments:
  the transceiver comprise a user equipment, UE, the UE configured to operate in accordance with a first mode, for example the V2X Mode 3, for a sidelink communication with one or more other UEs, and
  in the first mode scheduling of the resources for the sidelink communication with the one or more other UEs is performed by a base station, gNB, of the wireless communication system.

In accordance with embodiments, the transceiver comprise a user equipment, UE, the UE configured to operate in accordance with a second mode, for example the V2X Mode 4, for a sidelink communication with one or more other UEs, and to select resources from the transmit/receive resource set for the sidelink transmission autonomously and/or to signal respective resources on a control channel, e.g. a Physical Sidelink Control Channel PSCCH.

In accordance with embodiments, in case the UE is out of coverage of a gNB, the UE is configured to retain a last configuration of the resource set received from the gNB, or to revert to a default configuration or to select on of previously retained configurations of the resource set.

The present invention provides a transceiver for a wireless communication system, the transceiver for serving a plurality of user equipments, UEs, located in a coverage area of the transceiver, wherein
the transceiver configures for the coverage area of the transceiver a resource set, the resource set including a plurality of resources to be allocated for respective transmissions in the wireless communication system, and
the resource set comprises a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

In accordance with embodiments, the transceiver is configured to define for the coverage area of the transceiver one or more zones, each of the one or more zones having mapped thereto a resource set including a plurality of transmit resource sets and/or receive resource sets.

The present invention provides a wireless communication system, comprising:
a plurality of the transceivers configured to communicate with each other, and
a resource set in the wireless communication system, the resource set including a plurality of resources to be allocated for respective transmissions in the wireless communication system, and
wherein the resource set comprises a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

BWP as Resource Pool

The present invention provides a transceiver for a wireless communication system, the wireless communication system providing a resource set in the wireless communication system, the resource set including a plurality of resources to be allocated for respective transmissions in the wireless communication system, wherein
the resource set comprises a plurality of subcarriers in the frequency domain, and a plurality of symbols in the time domain, the resource set being defined by a bandwidth part, the bandwidth part being equal to or is smaller than a maximal bandwidth capability supported by the transceiver,
the bandwidth part includes a plurality of control resource sets, CORESETs, at least one of the CORESETs having both a transceiver-specific search space, e.g. user-specific search space, USS, and a common search space, CSS, and
the transceiver is configured to use resources from the bandwidth part for the communication.

In accordance with embodiments, the bandwidth part has a subcarrier spacing, SCS, higher than a SCS of a legacy LTE system.

In accordance with embodiments, wherein the wireless communication system comprises a plurality of zones, each zone including a resource set, and each resource set being defined by a different bandwidth part, BWP, wherein the different bandwidth parts may have a different or the same SCS.

The present invention provides a transceiver for a wireless communication system, the transceiver for serving a plurality of user equipments, UEs, located in a coverage area of the transceiver, wherein
the transceiver configures for the coverage area of the transceiver a resource set, the resource set including a plurality of resources to be allocated for respective transmissions in the wireless communication system,
the resource set comprises a plurality of subcarriers in the frequency domain, and a plurality of symbols in the time domain, the resource set being defined by a bandwidth part, BWP, the bandwidth part being equal to or is smaller than a maximal bandwidth capability supported by the transceiver, and
the bandwidth part includes a plurality of control resource sets, CORESETs, at least one of the CORESETs having both a transceiver-specific search space, e.g. user-specific search space, USS, and a common search space, CSS.

In accordance with embodiments, the transceiver is configured to define for the coverage area of the transceiver one or more zones, each of the one or more zones having mapped thereto a resource set including a plurality of transmit resource sets and/or receive resource sets.

The present invention provides a wireless communication system, comprising:
a plurality of the transceivers configured to communicate with each other, and
a resource set in the wireless communication system, the resource set including a plurality of resources to be allocated for respective transmissions in the wireless communication system,
wherein the resource set comprises a plurality of subcarriers in the frequency domain, and a plurality of symbols in the time domain, the resource set being defined by a bandwidth part, the bandwidth part being equal to or is smaller than a maximal bandwidth capability supported by the transceiver, and
wherein the bandwidth part includes a plurality of control resource sets, CORESETs, at least one of the CORESETs having both a transceiver-specific search space, e.g. user-specific search space, USS, and a common search space, CSS.

General

In accordance with embodiments, the set of resources comprises a plurality of contiguous or non-contiguous resources across a frequency domain and adjacent or non-adjacent across a time domain.

In accordance with embodiments, the set of resources defines a resource pool.

In accordance with embodiments, wherein the wireless communication system comprises a plurality of zones, each zone including a plurality of transmit/receive resource sets, and each zone identified by a zone ID, and In accordance with embodiments:
  a zone comprises a 2D or 3D area model to limit signaling overhead, or non-overlapping zones with a defined length and width and height,
  a zone ID is reused in space,
  a total number of zones corresponds to a used number of resource sets.

In accordance with embodiments, in case during an ongoing transmission the transceiver changes from a current zone to a new zone, the transceiver is configured to determine the transmit/receive resource sets for the new zone by recalculating the zone ID formula based on its new coordinates, and to request from the gNB resources to be used for transmitting the remaining amount to data, wherein the requesting may include automatically sending a buffer status report, BSR, to the gNB.

The present invention provides a wireless communication network, comprising:
  one or more base stations, BS, and one or more user equipments, UEs, a UE being served by one or more BSs or communication directly with one or more other UEs while being in connected mode or idle mode or inactive mode,
  wherein a base station and/or a UE comprises the transceiver according to the invention.

In accordance with embodiments, the set of resources comprises a plurality of contiguous or non-contiguous resources across a frequency domain and adjacent or non-adjacent across a time domain.

In accordance with embodiments, the set of resources defines a resource pool.

In accordance with embodiments:
the UE comprise one or more of
  a mobile terminal, or
  stationary terminal, or
  cellular IoT-UE, or
  vehicular UE, or
  an IoT or narrowband IoT, NB-IOT, device, or
  a ground based vehicle, or
  an aerial vehicle, or
  a drone, or
  a moving base station, or
  road side unit, or
  a building, or
  any other item or device provided with network connectivity enabling the item/device to communicate using the wireless communication network, e.g., a sensor or actuator, and
the BS comprise one or more of
  a macro cell base station, or
  a small cell base station, or
  a central unit of a base station, or
  a distributed unit of a base station, or
  a road side unit, or
  a UE, or
  a remote radio head, or
  an AMF, or
  an SMF, or
  a core network entity, or
  a network slice as in the NR or 5G core context, or
  any transmission/reception point (TRP) enabling an item or a device to communicate using the wireless communication network, the item or device being provided with network connectivity to communicate using the wireless communication network.

System

The present invention provides a wireless communication network, comprising at least one of the inventive UEs and at least one of the inventive base stations.

In accordance with embodiments, the receiver and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

The present invention provides a method for transmitting/receiving for a wireless communication system, the wireless communication system configuring a set of resources in the wireless communication system, the set of resources including a plurality of resources to be allocated for respective transmissions to one or more second transceivers in the wireless communication system, wherein
  the set of resources includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different, and
  the method comprises using resources from one or more of the plurality of transmit/receive resource sets for the communication.

The present invention provides a method for transmitting/receiving for a wireless communication system, the method serving a plurality of user equipments, UEs, located in a coverage area of a transceiver, wherein
  the method comprises configuring for the coverage area a resource set, the resource set including a plurality of resources to be allocated for respective transmissions in the wireless communication system, and
  a resource set includes a plurality of transmit resource sets and/or receive resource sets, the plurality of transmit/receive resource sets including at least a first transmit/receive resource set and a second transmit/receive resource set, the first transmit/receive resource set having a first property, and the second transmit/receive resource set having a second property, the first property and the second property being different.

The present invention provides a method for transmitting/receiving for a wireless communication system, the wireless communication system providing a resource set in the wireless communication system, the resource set including a plurality of resources to be allocated for respective transmissions in the wireless communication system, wherein
the resource set comprises a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different, and
the method comprises using resources from one or more of the plurality of bandwidth parts for the communication.

The present invention provides a method for transmitting/receiving for a wireless communication system, the method serving a plurality of user equipments, UEs, located in a coverage area of a transceiver, wherein
the method comprises configuring for the coverage area of the transceiver a resource set, the resource set including a plurality of resources to be allocated for respective transmissions in the wireless communication system, and
the resource set comprises a plurality of subcarriers in the frequency domain and a plurality of symbols in the time domain, the resource set including a plurality of bandwidth parts, the plurality of bandwidth parts including at least a first bandwidth part and a second bandwidth part, the first bandwidth part having a first bandwidth in the frequency domain, and the second bandwidth part having a second bandwidth in the frequency domain, the first bandwidth and the second bandwidth being different.

The present invention provides a method for transmitting/receiving for a wireless communication system, the wireless communication system providing a resource set in the wireless communication system, the resource set including a plurality of resources to be allocated for respective transmissions in the wireless communication system, wherein
the resource set comprises a plurality of subcarriers in the frequency domain, and a plurality of symbols in the time domain, the resource set being defined by a bandwidth part, the bandwidth part being equal to or is smaller than a maximal bandwidth capability supported by the transceiver,
the bandwidth part includes a plurality of control resource sets, CORESETs, at least one of the CORESETs having both a transceiver-specific search space, e.g. user-specific search space, USS, and a common search space, CSS, and
the method comprises using resources from the bandwidth part for the communication.

The present invention provides a method for transmitting/receiving a wireless communication system, the method serving a plurality of user equipments, UEs, located in a coverage area of a transceiver, wherein
the method comprises configuring for the coverage area of the transceiver a resource set, the resource set including a plurality of resources to be allocated for respective transmissions in the wireless communication system,
the resource set comprises a plurality of subcarriers in the frequency domain, and a plurality of symbols in the time domain, the resource set being defined by a bandwidth part, BWP, the bandwidth part being equal to or is smaller than a maximal bandwidth capability supported by the transceiver, and
the bandwidth part includes a plurality of control resource sets, CORESETs, at least one of the CORESETs having both a transceiver-specific search space, e.g. user-specific search space, USS, and a common search space, CSS.

The present invention provides methods for operating wireless communication systems in accordance with the present invention.

Computer Program Product

The present invention provides a computer program product comprising instructions which, when the program is executed by a computer, causes the computer to carry out one or more methods in accordance with the present invention.

Thus, in accordance with embodiments of the present invention, approaches for implementing services, like V2X services, are provided, which need to meet certain requirements, like an enhanced reliability and a reduced latency under a given quota criteria. Also, multicast/groupcast or unicast communications over a sidelink may be enabled.

With the introduction of the frequency range FR1 and FR2, where FR2 is defined up to 52.6 GHz, higher subcarrier spacings, SCSs, for different numerologies may be used, and embodiments of the inventive approach facilitate the use of higher subcarrier spacings in the context of resource pools. The resource pools are basically maintained, however, the resource pools are now, in accordance with first embodiments, primarily defined across the frequency, for example by providing within each resource pool a plurality of transmit and/or resource pools supporting different numerologies, thereby allowing simultaneous transmission and/or reception.

Further embodiments allow to use a lesser number of control sub-channels.

Yet further embodiments provide notifications on zone changes to a base station.

In accordance with other embodiments, the resource pool design makes use of the NR bandwidth parts concept, i.e., a resource pool may be defined by one or more bandwidth parts.

Embodiments of the above aspects are now described in more detail, wherein, initially, embodiments for the design of NR V2X resource pools using existing resource pools is described, followed by a description of embodiments of the design of NR V2X resource pools using bandwidth parts.

In the following reference is made to a resource pool. However, the invention is not limited to resource pool, rather the inventive approach is equally applicable to any set of resources. The pool or set of may include a plurality of contiguous or non-contiguous resources across a frequency domain and adjacent or non-adjacent across a time domain. Thus, when referring in this specification to a resource pool this to be understood also as a reference to a set of resources. A resource set may comprise a plurality of subcarriers in the frequency domain and a plurality of symbols in the time domain, or a number of physical resource blocks, PRBs, each PRB including a set of subcarriers in frequency, and a set of symbols in time domain.

Further, in the following reference is made to one or more zones for which resources may be configured, e.g., a coverage of a gNB may be separated into one or more zones. For example, each zone may include a plurality of transmit/receive resource sets, and each zone is identified by a zone ID. A zone may comprise a 2D or 3D area model to limit signaling overhead, or non-overlapping zones with a defined length and width and height. A zone ID may be reused in space, and the total number of zones may correspond to a used number of resource sets. A UE may determine the zone using a modulo operation.

However, the invention is not limited to this concept, rather the inventive approach is equally applicable to any transceiver/system not defining any zones and configuring for a communication a set of resources. Thus, when referring in this specification to a zone this to be understood also as a reference to the wireless communication system or a transceiver, like a base station, configuring for a coverage area or a cell or multiple cells a set of resources.

Moreover, in the following reference is made a transmit resource pool or set, however, the invention is not limited to a transmit resource pool or set, rather the inventive approach is equally applicable to a receive resource pool or set. In other words, a set of resources may be used for transmit, receive, or even both. Thus, when referring in this specification to a transmit resource pool or set this to be understood also as a reference to a receive resource pool or set.

Design of NR V2X Resource Pool Using Existing Resource Pools

The above-described concept using a subframe bitmap across time was used in the LTE V2X resource pool design primarily because it was carried from D2D and to cater to or handle cellular downlink resources also using the same band. This opened up the possibility of defining time orthogonal resource pools for different zones as well, as described above. A drawback with this design is that due to the half-duplex constraint, when a UE is transmitting in any defined frequency resource in a given subframe, it is not able to receive any other transmission from any other UE at the same time and, more importantly, in the same pool. Since UEs in the same zone (see FIG. 5) use the same resource pool, a transmitting UE cannot hear any transmissions from a neighboring UE that is also transmitting at the same time but on a different frequency. Although the UE may be able to listen to another UE using time orthogonal resource pools which are defined for another zone, this is not as vital as listening to UEs in the same zone, i.e., to UEs in the immediate vicinity of the transmitting UE.

Figure 8:
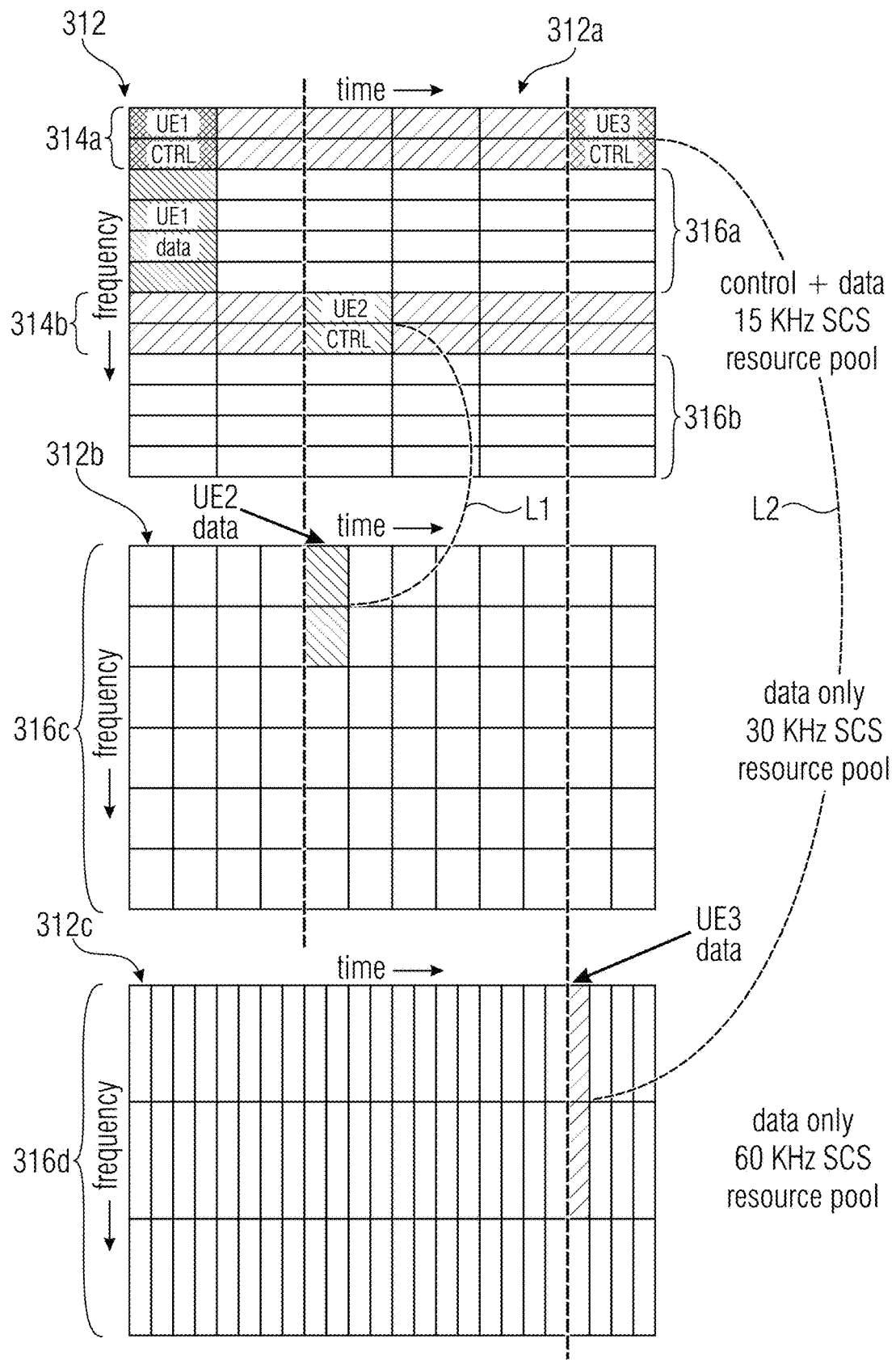
FIG. 8 illustrates schematically the resource pool definition in accordance with embodiments of the present invention including a resource pool having three separate transmit resource pools with different subcarrier spacings.

In accordance with embodiments of the present invention, the multiple numerologies as provided by NR are employed so as to create a minimum of three different resource pools or sets, like transmit and/or receive sets, that are defined across different subcarrier spacings, SCSs. For example, for a transmission below 6 GHz, three different subcarrier spacings are supported, namely a 15 kHz SCS, a 30 KHz SCS and a 60 KHz SCS. In accordance with embodiments, the existing resource pool definition as described above, is extended in such a way that more than one transmit pool per zone (see FIG. 5) is provided so that, in accordance with an embodiment, in which a base station uses eight different zones, at least 24 different transmit pools are defined. FIG. 8 illustrates schematically the resource pool definition in accordance with this embodiment, in which the resource pool 312 comprises three separate transmit resource pools 312a, 312b and 312c, each transmit resource pool 312a to 312c having a subcarrier spacing being different from the subcarrier spacings of the other pools. In the embodiment of FIG. 8, the resource pool 312 includes the first transmit resource pool 312a using a 15 kHz SCS, a second transmit resource pool 312b using a 30 kHz SCS, and a third transmit resource pool 312c using a 60 KHz SCS.

It is noted that the embodiments described herein are given with regard to a situation in which a base station is provided for configuring the resource pools, for example when serving mode 3 UEs or when mode 4 UEs are in coverage of a base station. However, the principles of the inventive approach described herein equally apply for the pre-configuration of resource pools used, for example, by UEs operating in mode 4 and not being in coverage of a base station.

Of the transmit resource pools 312a to 312c one or more may be active at the same time, and the activation/deactivation may be done in a similar way as in conventional approaches, for example by using respective control messaging, like the DCI messaging. Activating more than one of the transmit resource pools 312a to 312c provides for the possibility to transmit and receive at the same time across the resource pools having the different SCSs. As mentioned above, in conventional approaches, at a given time, a UE can either only transmit or receive from one single resource pool, which is a significant drawback because all UEs within the same zone use the same transmit resource pool. Since the transmit pool is also one of the receive pools for the UEs in the same zone, a UE that is transmitting at a given point in time will not be able to receive from any of the receive pools at the same time. In other words, this makes the UE, like a vehicle, deaf to other vehicles within its own zone at the same time, i.e., with respect to UEs or vehicles in the immediate vicinity of the transmitting UE. The inventive approach overcomes this particular constraint as the UE may now transmit in a given resource pool of a given SCS, for example in transmit resource pool 312a and, at the same time, receive in a different resource pool, for example transmit resource pool 312b, 312c of different SCS but belonging to the same zone.

Figure 5:
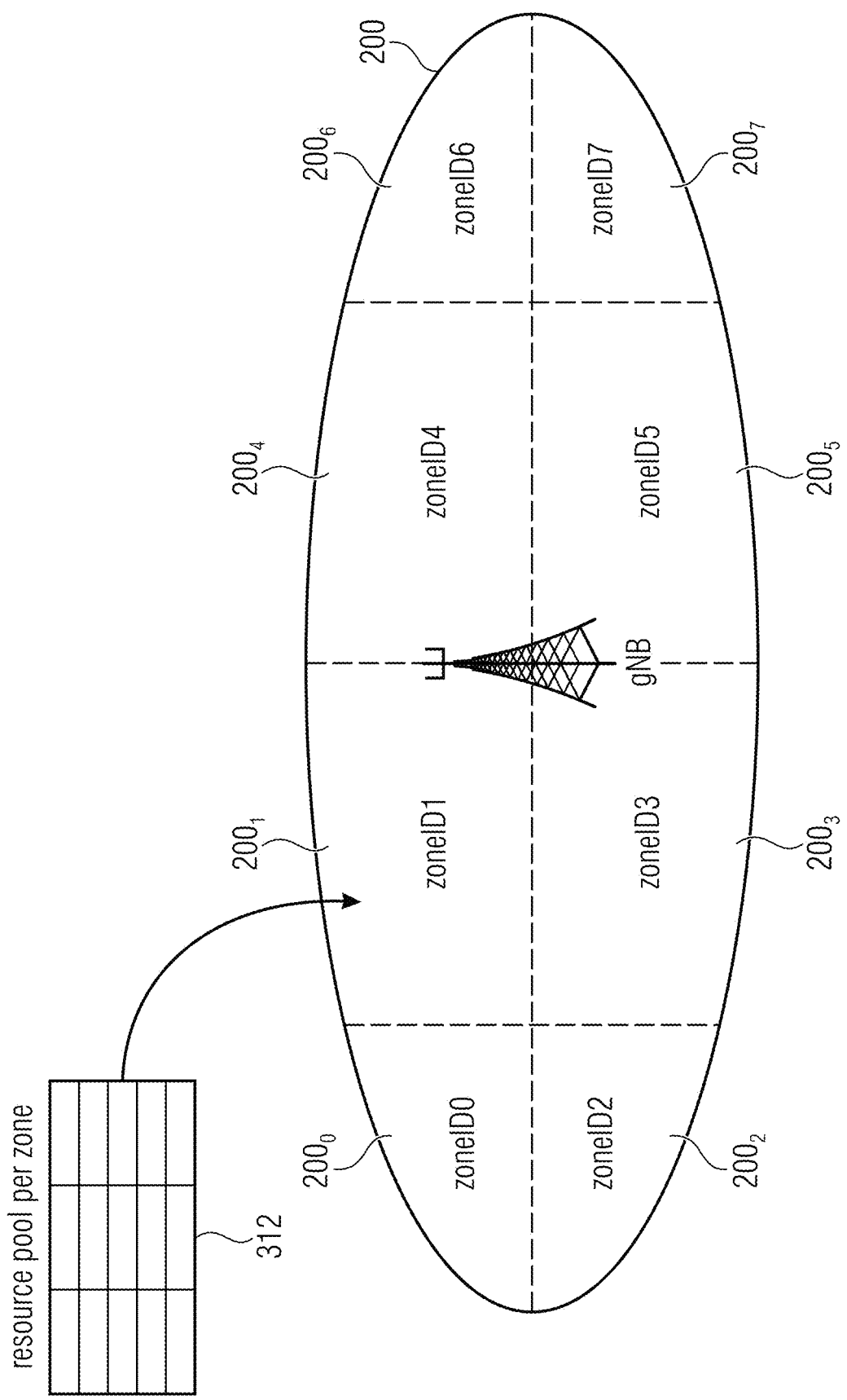
FIG. 5 is a schematic representation of a cell, like a cell in the network described in FIG. 1, which is divided into multiple zones.
Figure 6:
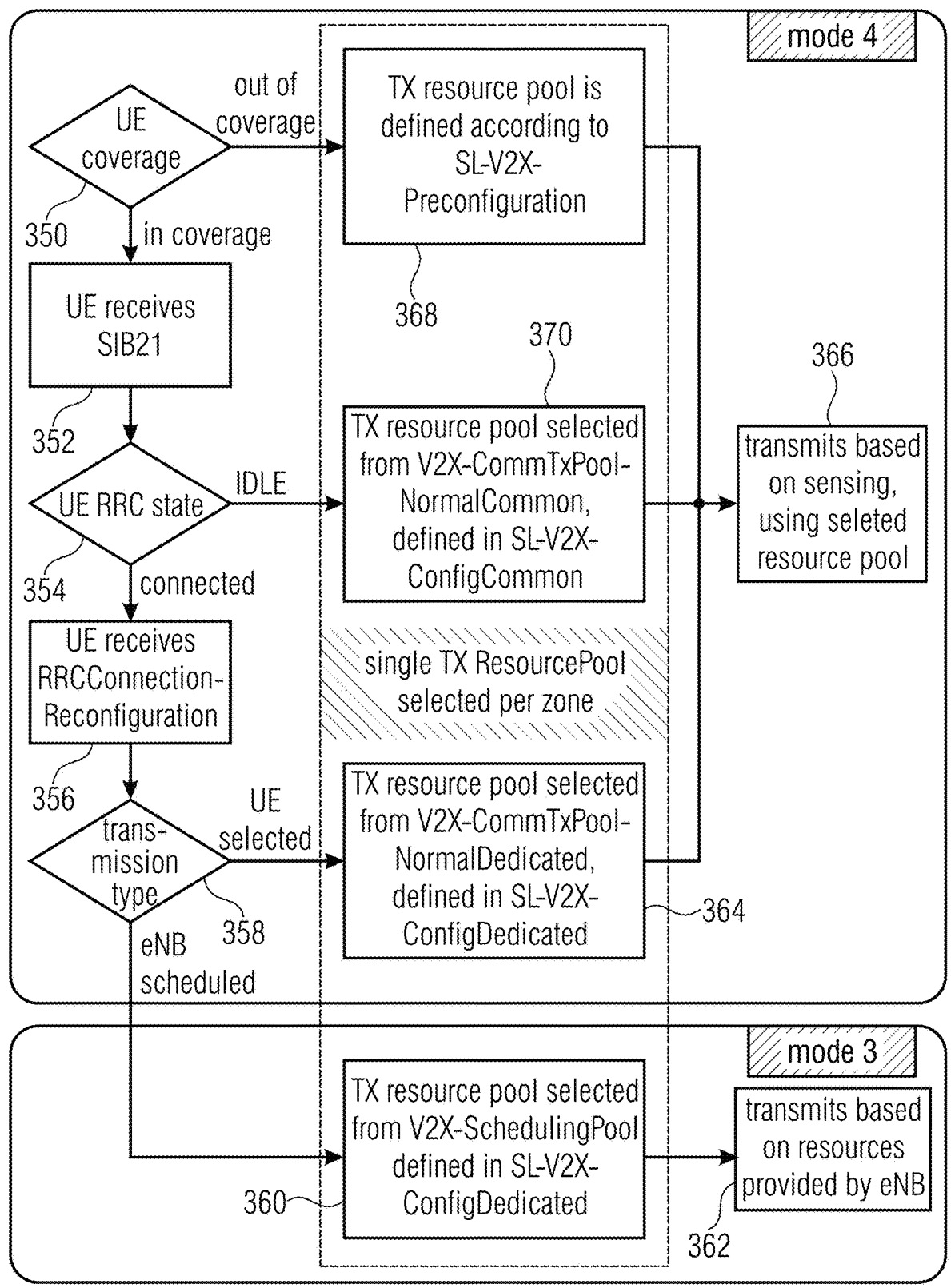
FIG. 6 is a diagram illustrating a transmit pool selection for a V2X communication.

To identify the respective transmit resource pools 312a to 312c the existing zoneID definition, as it is used in conventional approaches, in accordance with embodiments of the inventive approach, is extended. More specifically, to enable identification and use of the plurality of transmit resource pools per zone, the zoneID field in the conventional resource pool configuration is amended so as to support a plurality of transmit resource pools. In the following, the example of FIG. 5 is considered, in accordance with which a coverage area of a base station is divided into eight zones. When considering the embodiment of FIG. 8, the resource pool configuration needs to support at least 8 zones for each of the supported number of SCS. In this case, 8 zones and 3 resource pools of varying SCS per zone adds up to 24 pools. In accordance with embodiments, the formula for calculating the zoneID remains the same, with the variation of incorporating the resource pools of the different SCSs. For example, the zoneIDs 0 to 7 correspond to respective first transmit pools 312a in each zone with a 15 kHz SCS. This corresponds to the situation depicted in FIG. 5, and in accordance with the present invention, additional zoneIDs 8 to 15 are provided which correspond to the respective transmit pools in each zone with a 30 kHz SCS. Further zoneIDs 16 to 23 are provided which correspond to the respective transmit pools of each zone with a 60 KHz SCS. A formula to define the zoneID for the new zones, also referred to as NR zoneID, may be as follows:

$$NRzoneID = zoneID + numZones * SCSindex$$

where
NRzoneID—Zone ID used for NR V2X
zoneID—LTE V2X zone ID
numZones—Number of zones, 8 in this embodiment
SCSindex—subcarrier spacing index, depending on the NR numerology µ

Table 1 below illustrates the NR zoneIDs for the resource pools of a coverage area being divided into eight zones.

| Zone ID | SCS Index, µ | NR Zone ID |
|---------|--------------|------------|
| 0-7 | 0 | 0-7 |
| 0-7 | 1 | 8-15 |
| 0-7 | 2 | 16-23 |

Figure 4:
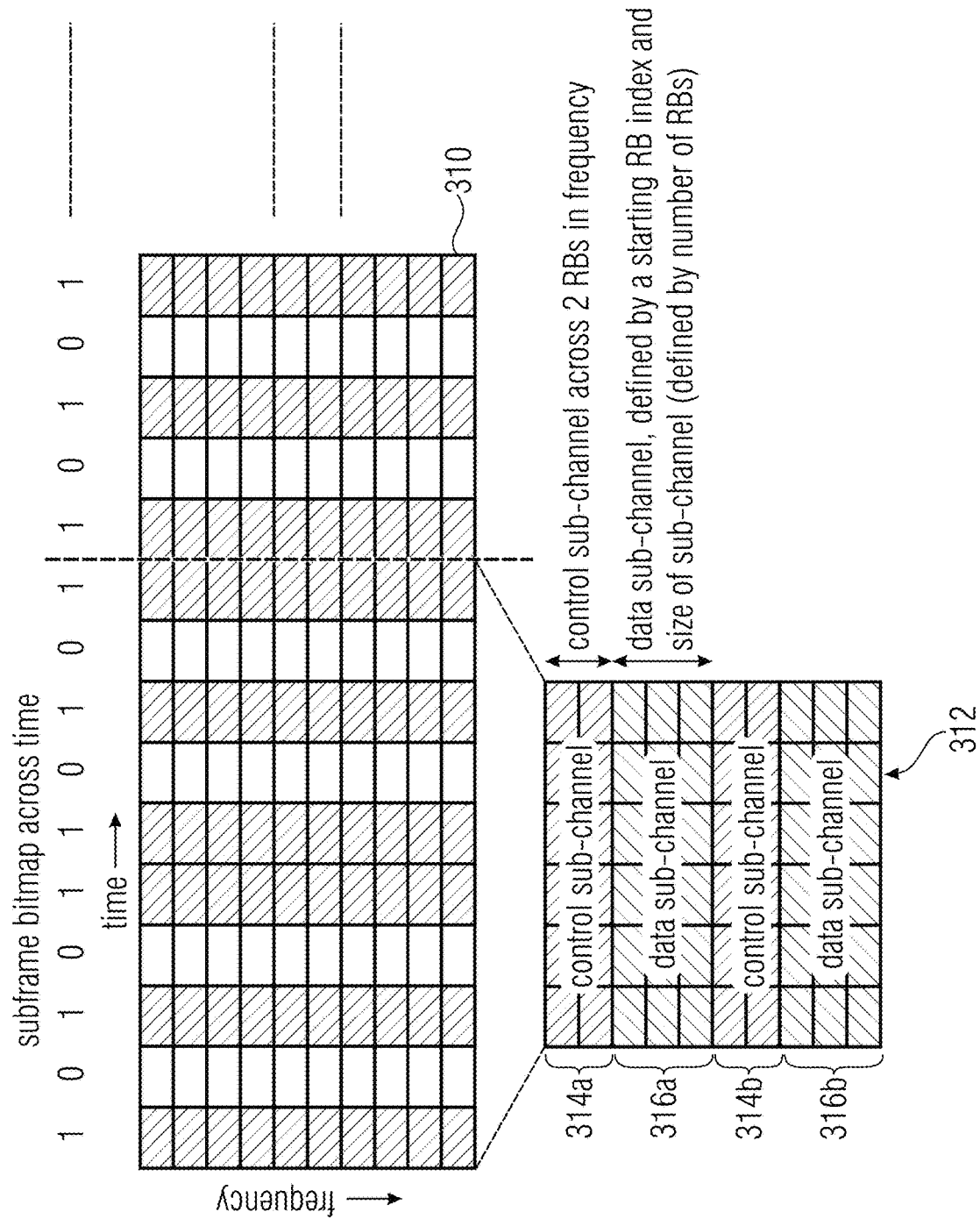
FIG. 4 illustrates an example of a resource pool which is defined across time and frequency.

In accordance with further embodiments, control information from an existing resource pool may be maintained and extended so as to point to NR resource pools provided in addition. When considering the above embodiment of using pools having three different SCSs, the SCS of 15 kHz corresponds to the subcarrier spacing as in existing resource pools in accordance with the LTE system. In such a single SCS, single transmit pool V2X system, the UEs have to listen to the PSCCH control channel of all of the defined resource pools at all times. Introducing multiple SCS pools may result in the need that the UE has to listen to multiple control sub-channels across the resource pools of different SCSs which may increase the processing effort and time at the UE. Therefore, in accordance with embodiments and given that the 15 kHz SCS resource pool will be used also for backward compatibility with legacy LTE UEs, the UEs, in accordance with this embodiment, use only the control sub-channel in the first transmit resource pool 312a, i.e., the second and third transmit resource pools 312b and 312c do not include or define resources for a control channel. In accordance with this embodiment, the control information will be extended so as to include a pointer indicating where data transmission in the respective resource pools are carried out. FIG. 8 illustrates this embodiment. When compared to FIG. 4, one can see that the first transmit resource pool 312a includes the respective control and data sub-channels 314a, 314b, 316a and 316b. As is schematically indicated by dotted lines L1, L2 the control sub-channels indicate for UE2 and UE3 that the data can be found in the second or third resource pool 312b or 312c using a corresponding pointer L1, L2. For example, the control messaging, like the SCI, may include a parameter defining a transmit resource pool in which the data will be transmitted, for example by adding an additional parameter pointing to the NR zoneID mentioned above which corresponds to the respective transmit resource pool of a given SCS. The UEs may also use the scalable TTI feature of NR to start the transmission of the data in the closest upcoming TTI, as is depicted in FIG. 8.

In accordance with embodiments, the pointer may not point to the data transmissions but to one or more secondary control channels including, e.g., remaining or further system information. The pointer may also point to both the data transmission and the secondary control channel. For example, a control channel (CCH) pointing to another control channel may be provided, the other control channel pointing to a data channel (DCH).

The above described approach is advantageous as it reduces the burden on the UE to keep scanning multiple control sub-channels and, in addition, it allows for a more efficient resource allocation in the higher SCS resource pool 312b and 312c. Furthermore, control channel pointing mechanism allows to send general control information in a low frequency band, and frequency band-specific control information, e.g. especially used for high frequency bands in FR2, in the particular high frequency band itself.

In accordance with further embodiments, the control channel may further include a signaling to specify the transmission subframe. When considering the fact that a 15 kHz SCS subframe is equivalent to two 30 kHz SCS subframes and four 60 kHz SCS subframes, in addition to the indication of a transmission in a higher SCS resource pool, also the offset of the subframe in the corresponding resource pool is signaled, for example by adding a field in the SCI describing the subframe offset which would be, for example, 0 or 1 for the 30 kHz SCS resource pool 312b and 0, 1, 2 or 3 for a 60 kHz SCS resource pool. In the example depicted in FIG. 8, the offset is assumed to be 0, as is indicated by UE2 data and UE3 data starting at the same subframe as the UE2 control data and the UE3 control data in the control sub-channel 314a, 314b in the first resource pool 312a. In accordance with this embodiment, the offset is indicated in the time domain. In accordance with other embodiments, the offset may be signaled in the frequency domain, either only in the frequency domain or both in the time and frequency domains. For example, the offset may refer to subframes and/or slots in time and and/or PRBs in frequency.

In the example of FIG. 8, it is illustrated that the second and third resource pools 312b and 312c only include data sub-channels 316c and 316d but no control sub-channels.

It is noted that the above mentioned SCS of 15 kHz, 30 KHz and 60 KHz are only examples in FR1, and that similarly, for FR2, a SCS of 60 kHz (extended CP), 120 KHz and 240 KHz may be used. Thus, in accordance with embodiments, the transmit/receive resource set may be selected from a plurality of resource sets having different SCSs, like 15 kHz, 30 kHz, 60 kHz, 120 KHz, and 240 kHz or any other value, and at least one of the resource sets provides for a backward compatibility, e.g., the above mentioned 15 kHz SCS resource set providing backward compatibility with legacy UEs. For example, the SCS may be selected from the table below.

TABLE 5.1-1

< 38.300-: Supported transmission numerologies and additional info. >

| Numerology | Sub-carrier Spacing (kHz) | CP type | Supported for Data (PDSCH, PUSCH, etc.) | Supported for Sync (PSS, SSS, PBCH) | PRACH |
|------------|---------------------------|---------|-----------------------------------------|--------------------------------------|-------|
| N/A | 1.25 | | No | No | Long Preamble |
| N/A | 5 | | No | No | Long Preamble |
| 0 | 15 | Normal | Yes | Yes | Short Preamble |
| 1 | 30 | Normal | Yes | Yes | Short Preamble |
| 2 | 60 | Normal, Extended | Yes | No | Short Preamble |
| 3 | 120 | Normal | Yes | Yes | Short Preamble |
| 4 | 240 | Normal | No | Yes | |

Design of NR V2X Resource Pools Using Bandwidth Parts

In the following further embodiments of the inventive approach are described for designing NR resource pools which make use of the bandwidth part concept as defined by NR.

Figure 10:
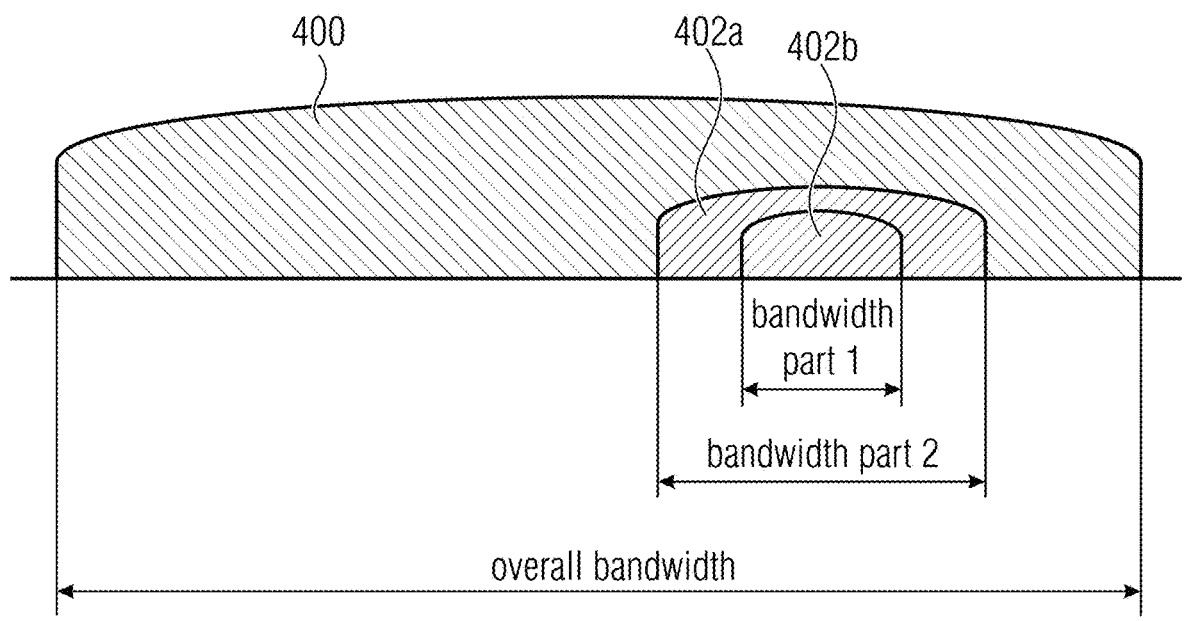
FIG. 10 illustrates the activation of BWPs with different numerologies and/or different bandwidth size.

NR 5G systems introduce the concept of bandwidth parts, BWPs. Due to the wide bandwidth operation of NR 5G systems, UEs may only be able to transmit and receive in a frequency range which is a subset of the entire bandwidth. The bandwidth may be adapted according to the entailed throughput which improves the energy efficiency of the system. In particular, a UE will perform decoding only of a smaller part of the entire bandwidth thereby saving energy and thus battery power, especially since the power consumption of an analog-to-digital converter, ADC, scales with the size of the bandwidth. FIG. 10 schematically illustrates the concept of bandwidth parts and illustrates at 400 the overall bandwidth available, as well as two bandwidth parts 402a and 402b having a bandwidth being less than the overall bandwidth 400. Another benefit of the BWP concept is that fast switching between different subcarrier spacings is possible, and that also UEs having only low bandwidth capabilities are supported on wide band carriers. Moreover, load balancing between the overall transmission bandwidth is improved. A BWP includes a set of continuous resource blocks within the entire bandwidth of the system, and each BWP is associated with a specific numerology, like a subcarrier spacing, SCS, and a respective sidelink prefix. A BWP may be equal or larger than the size of a synchronization sequence, SS, block, also referred to as SSB, and may or may not contain the SSB. A UE may have up to four BWPs configured for the downlink and for the uplink each, however, only one BWP for the uplink and for the downlink may be active at a given point in time.

Figure 11:
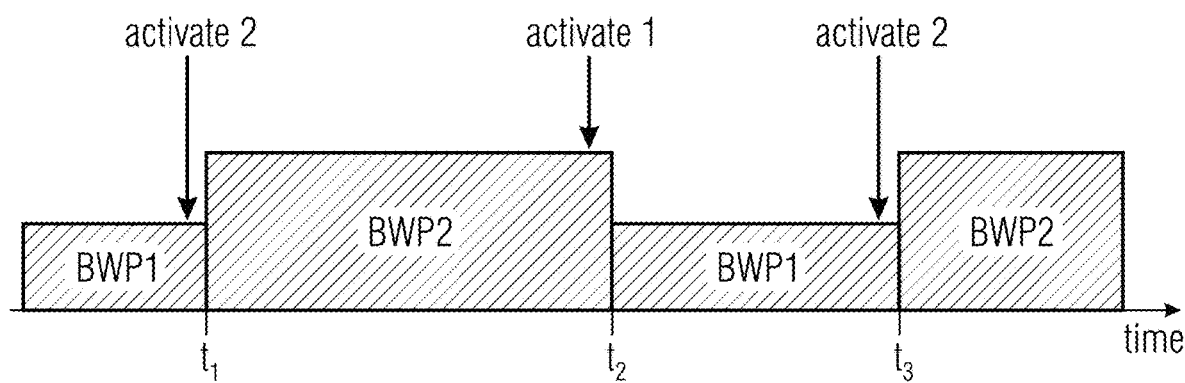
FIG. 11 illustrates an example of bandwidth parts using CORESETs containing user specific and common search spaces.

FIG. 11 illustrates the activation of BWPs with different numerologies and/or different bandwidth size. A first bandwidth part BWP1 of a first, lower bandwidth and a second bandwidth part BWP2 of a higher bandwidth is illustrated. Over the time, responsive to a signaling, like the RRC signaling, the respective BWPs may be activated. In the example of FIG. 11, initially, the first bandwidth part BWP1 is active. At a time $t_1$, the bandwidth part BWP1 is deactivated and the bandwidth part BWP2 of higher bandwidth is activated, by external signaling, as is schematically illustrated in FIG. 11 by the signal "activate2", meaning that now the bandwidth part BWP2 is to be activated causing a deactivation of the first bandwidth part BWP1. At time $t_2$ the first bandwidth part is activated once again, and at time $t_3$ the second bandwidth part is activated again. The durations may be the same or different. A BWP may overlap in frequency or may cover different bandwidths. In the downlink, for switching between BWPs, the receiver is provided with some gap time to allow for retuning of the radio front end, RF, as is illustrated in FIG. 11 where it can be seen, that the respective activate signals are received slightly ahead of the actual switching time $t_1$, $t_2$ and $t_3$.

The BWPs may be configured by RRC signaling, and the activation and deactivation may be enabled by PDCCH signaling. The MAC layer may confirm an activation/deactivation using a MAC control element. Also, a time-based deactivation may be implemented, to reduce the bandwidth once data transmission is completed and to save signaling overhead. The deactivation may also be provided by a MAC control element that is in the last setup packet being transmitted.

For a serving cell, the BWP, where the SSB is transmitted and where system information is received, is referred to as the initial downlink BWP. In the uplink, the initial BWP is the bandwidth over which the RACH is transmitted, and the RACH resources may be configured by the system information. Once multiple BWPs are configured, one of the BWP may be the default BWP which may be used as a fallback, in case a transmission has ended or in case the UE receives a control signal on any BWP to trigger a fallback or in case an inactivity time expires. In carrier aggregation, CA, or in dual connectivity, DC, the base station may configure at least a first active BWP in the downlink and first active BWP in the uplink.

HARQ retransmissions over the bandwidth parts are possible. Further, the UE may also be active outside the BWP, for example to perform RRM measurements, e.g., to transmit sounding reference signals, SRS. In the active BWP, the UE monitors at least one physical downlink control channel for which control element resources, CORESETs, are configured.

Figure 9:
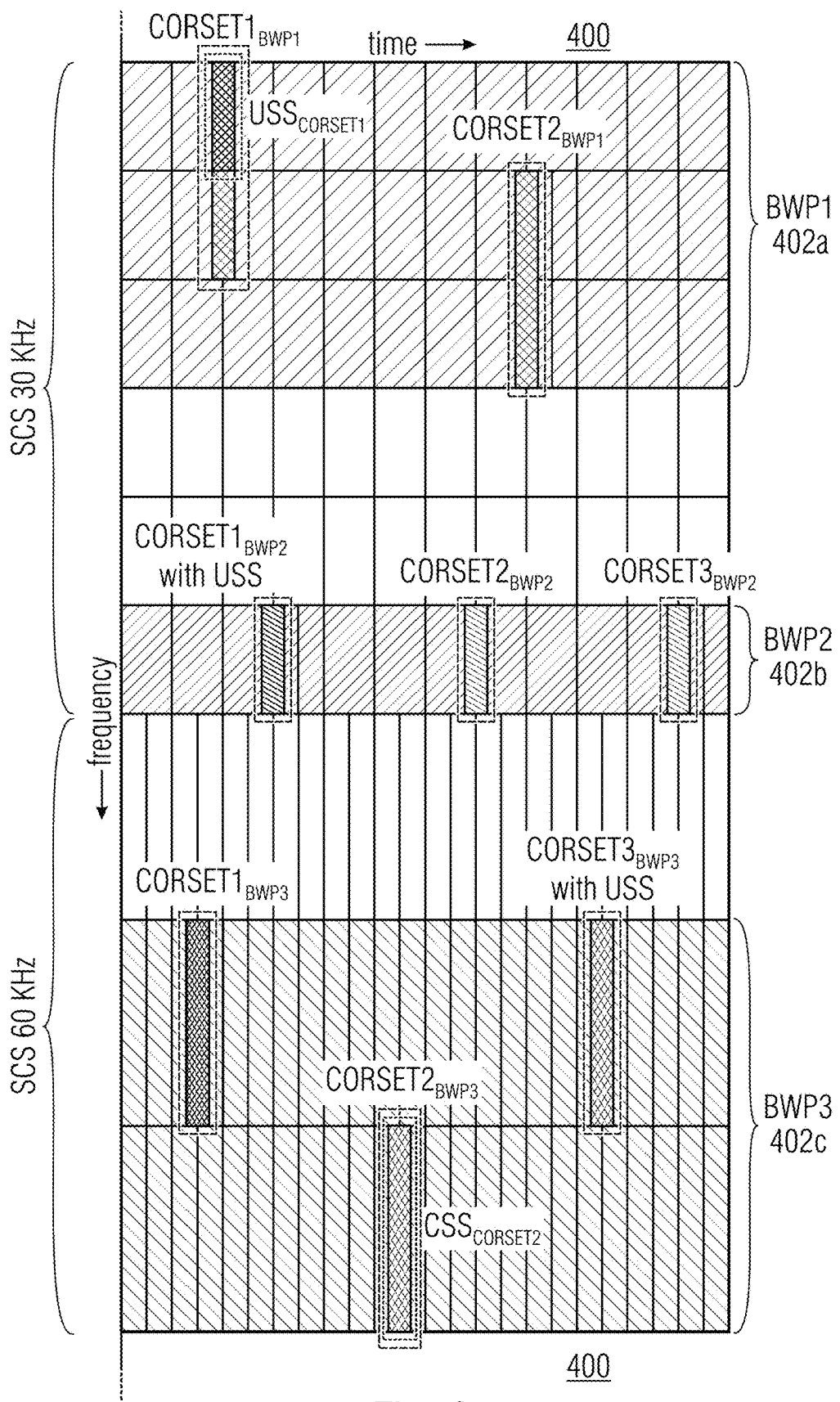
FIG. 9 schematically illustrates the concept of bandwidth parts.

FIG. 9 illustrates an example of bandwidth parts using CORESETs containing user specific and common search spaces. The frequency domain extends along the vertical direction, and the time domain extends the horizontal direction. The overall available bandwidth is schematically indicated at 400, and in the example of FIG. 9 three bandwidth parts 402a to 402c are illustrated of which bandwidth parts 402a and 402b use a same subcarrier spacing, SCS, of for example 30 kHz, and the third bandwidth part 402c uses a subcarrier spacing of 60 kHz. In the example of FIG. 9, the respective bandwidth parts are located along the frequency such that they are separated by a certain bandwidth, however, as illustrated in FIG. 10, and as said above, the bandwidth parts may also be continuous or even overlapping.

Each of the BWPs contains at least one control resource set, CORESET, with a UE-specific search space, USS. A CORESET may also be configured to contain a common search space, CSS, which besides UE specific signaling may be used for specific purposes such as system information, paging, group information and the like. A USS is the space across time and frequency which a UE monitors for possible reception of control information specifically configured and directed to this very UE. A CSS, on the other hand, is the space across time and frequency which is monitored by the UE for possible reception of control information that is configured to be received or monitored by all UEs. For example, the CSS may be used during the initial exchange of RRC messages before the USS is configured by an RRC reconfiguration message. In case of a carrier aggregation, CA, or a dual connectivity, DC, the active DL-BWP contains at least one CORESET with a CSS.

In the example of FIG. 9, the first BWP 402a includes two CORESETs, CORESET1, CORESET2 of which only CORESET1 is partially defining a USS, and no CSS is provided in BWP 402a. BWP 402b includes three CORESETs, CORESET1 to CORESET3 of which CORESET1 is completely used as a USS. Again, no CSS is provided. In BWP 402c, three CORESETs, CORESET1 to CORESET3 are provided of which CORESET2 defines a CSS, and CORESET3 defines a USS.

Figure 12:
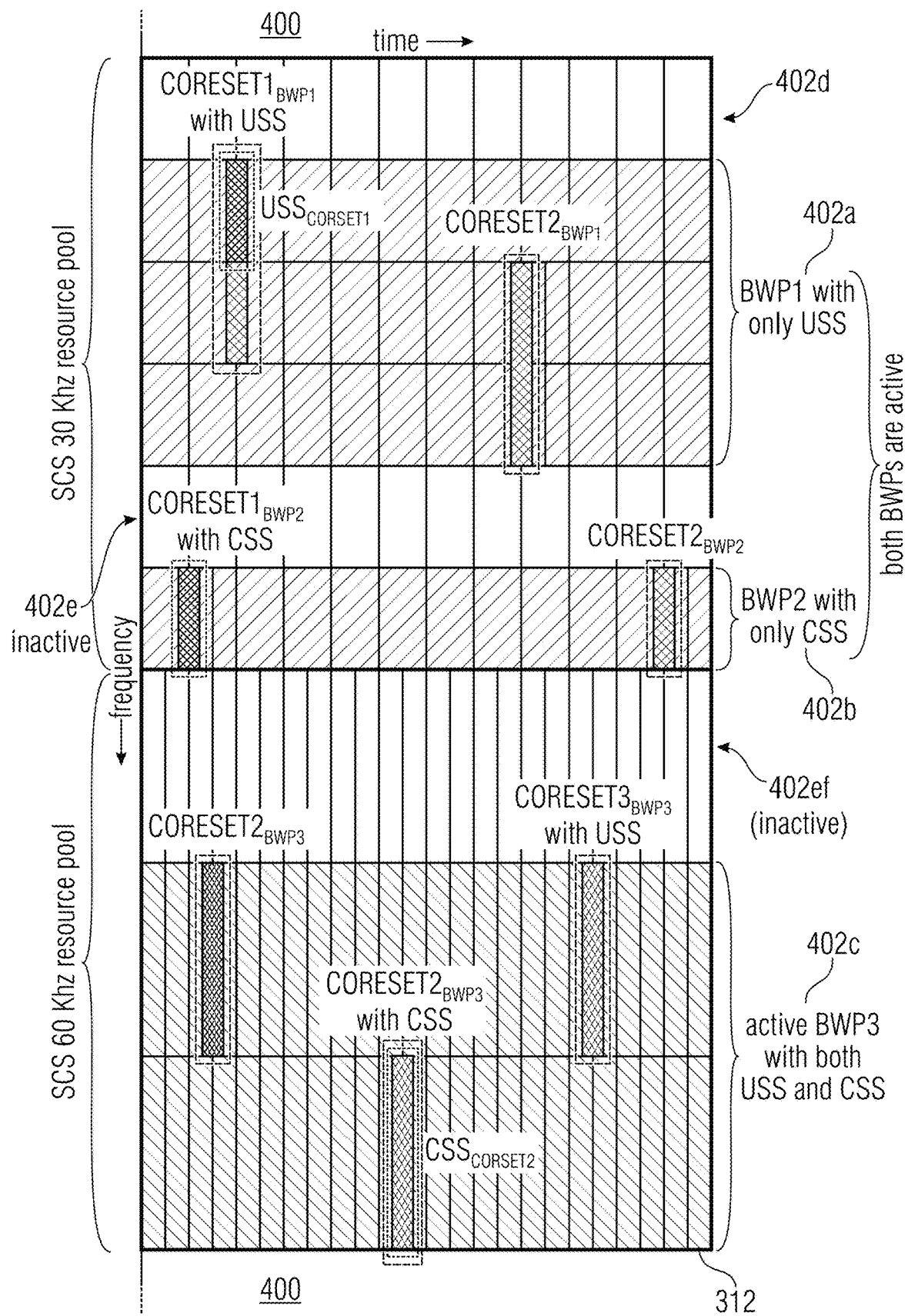
FIG. 12 illustrates an embodiment of the present invention defining multiple resource pools using the BWP concept of NR.

A UE may be configured with BWPs of different numerologies and therefore different UEs with different numerologies may be scheduled in different frequency parts of the wide band carrier. In the example of FIG. 12, BWPs 402a and 402b are configured with the numerology of a subcarrier spacing of 30 kHz, while BWP3 402c is configured with the numerology of 60 kHz subcarrier spacing. Although the BWPs are initially configured by RRC signaling, they may be activated or deactivated using DCI signaling as stated above, however, still, the constraint applies that only a single DL or UL BWP may be active at a given point in time.

When applying the above-summarized BWP concept, the resource pools for NR V2X systems, in accordance with embodiments, may not need to be divided into control and data sub-channels, rather, the resource pool is defined as a section of the NR bandwidth that is reserved, for example, for V2X PC5 communications, namely exclusively for communications between UEs. The resource pools may be defined as described above with regard to the first embodiment so that, for example, also 24 transmit resource pools may be defined for eight geographical zones of the coverage area of a base station, and each zone may include three pools catering to different SCSs, like 15 kHz, 30 KHz and 60 KHz.

FIG. 12 illustrates an embodiment defining multiple resource pools using the BWP concept of NR. FIG. 12 illustrates along the vertical line, like in FIG. 9, the frequency domain and, schematically, illustrates at 400 the overall bandwidth available in which first, second and third BWPs, bandwidth parts, 402a to 402c are illustrated which, in turn, define respective transmit resource pools. The first and second BWPs or bandwidth pools 402a and 402b are using a 30 kHz SCS, while the third bandwidth part or resource pool 402c uses a 60 KHz SCS. Defining the respective transmit resource pools using the BWPs which may be activated/deactivated selectively, allows the UEs to scan and monitor only BWPs which are active at a given point. For example, in the embodiment of FIG. 12, the bandwidth parts between the parts 402a and 402c are not-activated, and only the active bandwidth parts 402a, 402b and 402c are configured by the UE and are used as the different transmit resource pools at a given time.

When considering a sidelink communication among UEs, the sidelink BWPs may be defined by an RRC signaling in the initial access procedure. Also, during the RRC signaling, the BWPs across the different SCSs may be defined within the resource pools. A default BWP may be defined in the 15 kHz SCS resource pool and may be used as a legacy structure of the resource pool design to allow backwards compatibility. This allows to cater to legacy UEs that cannot transmit using the higher SCS resource pools.

Depending on a current load level of the system, the initially defined BWPs being part of the resource pool may be selectively activated of deactivated, for example using a DCI send from the base station to the UEs. For example, when considering FIG. 12, in a high load situation, the base station may signal to the UEs that all three BWPs 402a to 402c are now activated as resource pools while in low load situations, only one of the BWPs may be activated. In case an even higher load is experienced in the system, even more bandwidth parts may be activated, for example one or more of the bandwidth parts 402d to 402f which are illustrated in FIG. 12 as being inactive.

In case a UE comes out-of-coverage, like a mode 4 UE, it may continue to use the latest or last configuration received from the base station or it may revert to a default configuration of the resource set, the default configuration being hardcoded into the UE or being pre-configured by the gNB or being configured by another UE via sidelink relaying. The gNB may provide the UE with different transmit resource pools or sets to use at different conditions. The gNB may provide a normal transmit resource pool or set to be used when in coverage, and provides a pre-configured transmit resource pool or set which essentially over-writes the already existing pre-configured set which is hard coded into the UE, like a car modem.

As described above, there may be embodiments in which only a single BWP is active, and such a single active BWP includes a CORESET containing a USS to cater to unicast communications, like a platoon-based communication, and a CORESET containing a CSS to cater to control information being broadcast by neighboring UEs. In FIG. 12, for example the third BWP 402c includes both CORESETs, so this may be a BWP that can be used when only one BWP is activated. In case another one of the BWPs is to be the only one to be activated, the CORESETs need to be adapted so that in the first BWP 402a an additional CORESET containing a CSS is provided, and in a second BWP 402b an additional CORESET including a USS is provided.

In accordance with further embodiments, as mentioned above, also more than one BWP may be active, and in case there are at least two active BWPs in the resource pool, one of the active BWPs contains a CSS and one of the active BWPs contains a USS, as is illustrated in FIG. 12 with respect to BWP 402a and 402b both being active and one, namely BWP 402a including the USS and the other one, namely BWP 402b including the CSS. Essentially, a resource pool containing one or more BWPs should have at least one CORESET containing a USS and one containing a CSS, either in the same BWP or in different BWPs. This allows the UE to transmit in a given BWP and to receive control information regarding any transmissions from neighboring UEs within the same geographical area or in the same zone which transmits on the same resource pool.

In accordance with further embodiments, one of the BWPs may be exclusively used for resource allocations. For example, there may be multiple frequency bands supporting V2X services, like safety services, non-safety services and broadband services, and some of the services may be specifically allocated to a certain band while others may share the spectrum. In view of the overall capacity constraint, there may be multiple bands and multiple BWPs that need to be monitored by all UEs which, however, may increase the complexity for the UE to monitor multiple sidelink resource allocations in multiple BWPs continuously. On the other hand, the UE may not miss any important transmission in its vicinity. For wide band services, the UEs may transmit wide band signals, and the signals may be transmitted in different parts of the bands according to the load. In this situation it may be difficult for other UEs to find the allocations unless all bands are continuously monitored. Further, UEs that are out-of-coverage may no longer be configured by the gNB with specific BWPs.

Therefore, in accordance with further embodiments of the inventive approach, a default BWP is defined where all resource allocations for one or more services are sent. The control resources may either be configured by the gNB or may be pre-configured in the UE. The configuration may contain a CSS that allows each UE to listen to all services in its vicinity. In FIG. 12, for example the BWP 402a may form the default bandwidth and the CORESET2 may be the common search space to be monitored by the UEs with regard to resource allocations for the respective services. The UEs may also search the default BWP for synchronization signals, and in case no gNB synchronization signal and no UE synchronization signal is found, the UE may be start transmitting a synchronization signal, like the SLSS, and its physical sidelink broadcast channel, PSBCH.

In other words, the default BWP defines a default control channel which may also be used for wide band transmissions in other bands or BWPs by cross BWP and/or cross carrier scheduling. The UEs may listen only to one of the control channels in the default BWP, thereby improving the power saving for the UE and ensuring that all UEs listen to control channels receiving all V2X services, for example. In case of broadband transmissions or other data transmissions taking place in different BWPs or on different carriers, some time for RF retuning may be provided so as to allow the UEs to retune the radio front end for decoding.

Figure 13:
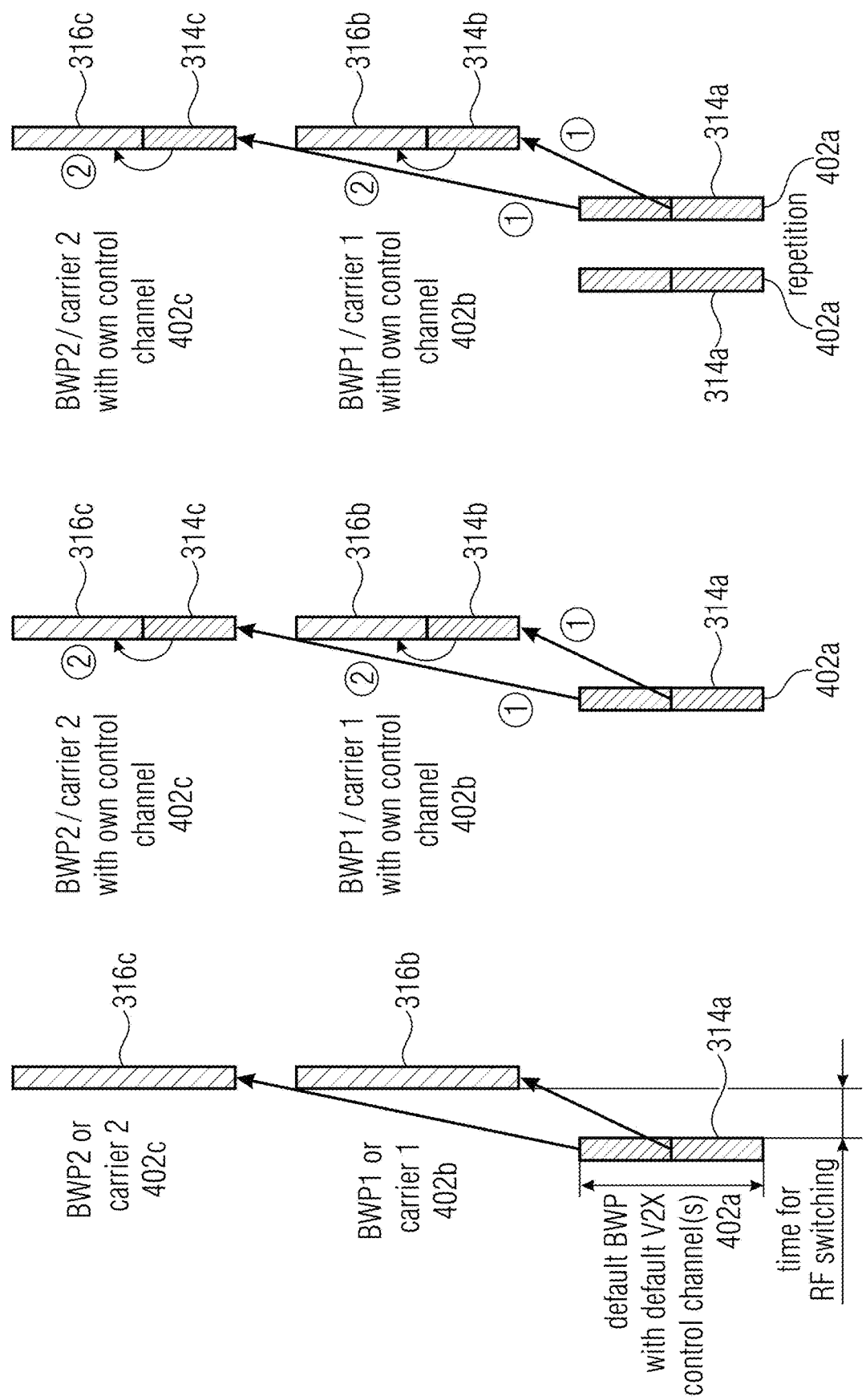
FIG. 13*a-c* illustrates embodiments using a default BWP.

FIG. 13 illustrates embodiments using the above-described default BWP, and in FIG. 13(a) one or more control channels 314a may be defined in the default BWP 402a, and the control channel 314a may point to data transmissions in the second or third BWP 402b, 402c.

In accordance with yet other embodiments, the V2X control channel may also point to an additional control channel provided in another BWP, where the actual transmission takes place, as is indicated in FIG. 13(b). The one or more control channels 314a defined in the default BWP 402a point to respective control channels 314b and 314c in the bandwidth parts 402b and 402c which, in turn, point to the respective data transmissions in the data sub-channels 316b, 316c of the respective bandwidth parts 402b, 402c. Thus, in accordance with such an embodiment, a V2X control channel may point to another V2X control channel that may be of interest for some of the UEs, for example the members of a platoon. In other words, the first message may make aware to other UEs that there is another BWP or carrier with specific control information that should be monitored, which may also be referred to as a sidelink service announcement on another BWP and/or carrier.

For less delay critical data, the resource allocation and the predefined control channel may be repeated several times, as is indicated in FIG. 13(b) so that all UEs interested in this data may reliably receive the resource allocation before the large data (in the other bands) is sent. As is illustrated in FIG. 13(c), the control sub-channel 314c is sent twice using the default BWP and transmission of the data in the respective data channels 316b and 316c of the second and third BWPs 402a and 402c start only once the initial or default control channel has been sent twice. Naturally, it may also be sent more often.

The sensing will primarily be based on the just-described control resources and not on the data transmissions in a different band. UEs that wish to transmit data may decode the scheduling assignments in the exclusive control resource to understand the scheduled resource allocations of other UEs and to avoid respective PRBs in its own autonomous selection, i.e., when operating in mode 4.

Figure 14:
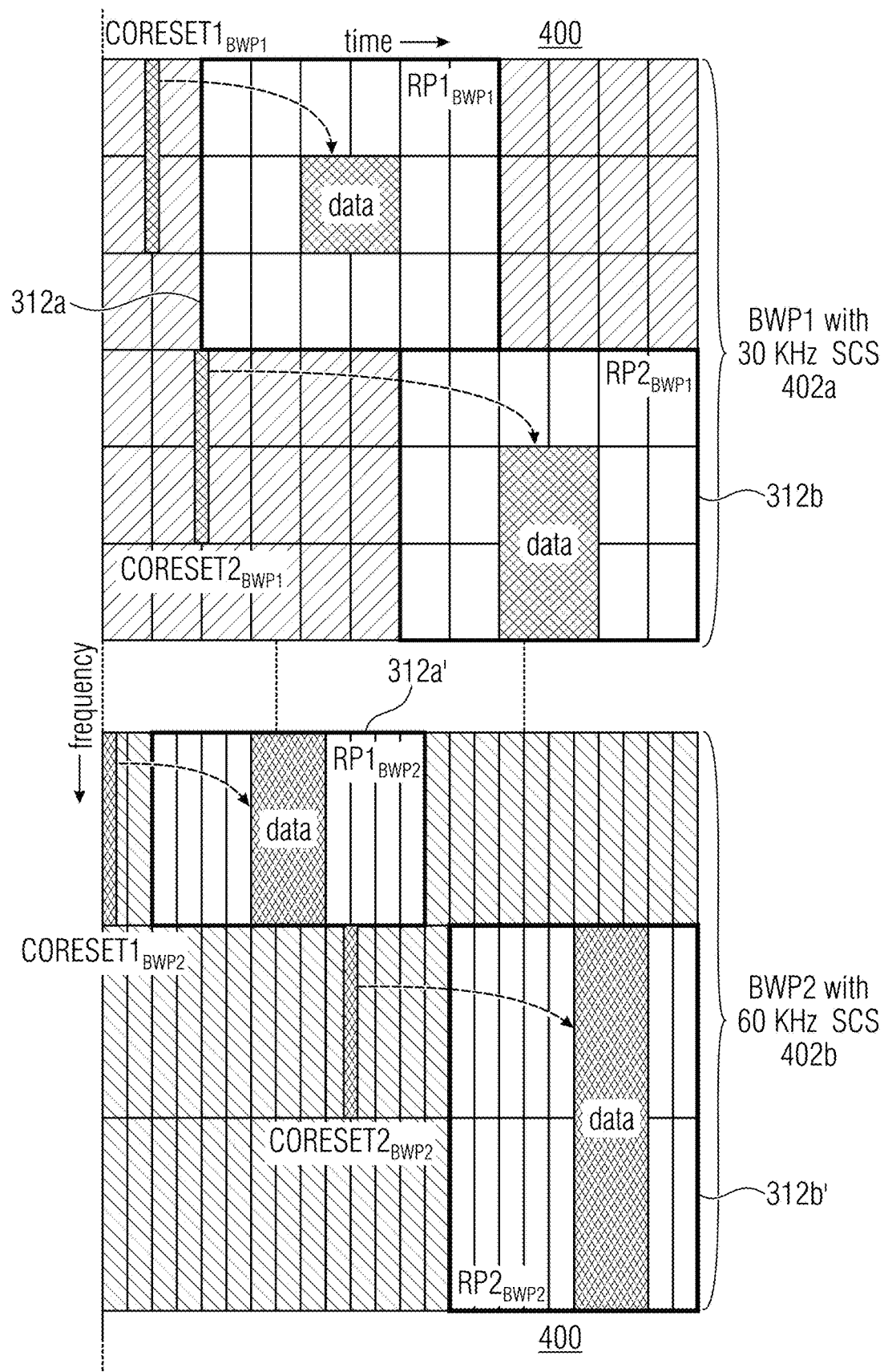
FIG. 14 illustrates an embodiment of multiple NR resource pools being defined within respective sidelink BWPs.

In accordance with yet further embodiments, multiple resource pools may be defined within a single bandwidth part. FIG. 14 illustrates an embodiment of multiple NR resource pools being defined within respective sidelink BWPs. In the embodiment of FIG. 14, a first bandwidth part 402a having a 30 KHz SCS includes a first resource pool 312a and a second resource pool 312b for the transmission of data. In addition, two CORESETs are provided defining resources where control information is transmitted and includes an indication where the data in the respective resource pool 312a and 312b is found. As is further depicted in FIG. 14, the concept may be implemented also when using more than one bandwidth part, and in a similar way as the first bandwidth part 402a, also a second bandwidth part 402b may define respective pools 312a' and 312b'. Thus, as illustrated in FIG. 14, a sidelink bandwidth part may contain multiple NR resource pools 312a, 312b within a single BWP. The NR resource pools 312a, 312b do not include dedicated control and data sub-channels, instead, multiple CORESETs are provided within the BWP corresponding basically to the number of defined resource pools that handle the control and scheduling assignment messages. Further, the control information points to data which is transmitted using the resources inside the selected NR resource pools 312a and 312b.

In accordance with yet further embodiments, a resource pool for V2X services may be defined by a single bandwidth part defined in a way as described above in the overall system bandwidth, and the bandwidth part contains at least one CORESET having both USS and CSS. Advantageously, the bandwidth part has a higher SCS, like 30 kHz or 60 KHz. In accordance with further examples, also more than one bandwidth part may be defined, the bandwidth parts having different SCSs.

Zone Change Notification

Further embodiments concern a zone change notification which may be needed in a situation in which a mode 3 UE moves from a current zone to a new zone and thereby uses new information about how the resource pool is defined in the new zone. In other words, when a UE changes from one zone to another, also the transmit resource pools change. If the UE was not transmitting, this is not critical as then the BS will signal to the UE information about the new resource pools in the new zone. However, if the UE was currently transmitting data, for example was in between an SPS transmission and still has data to transmit, the resources scheduled by the BS for the previous resource pool may not be valid in the new resource pool corresponding to the new zone so that, in such a situation, the UE automatically requests from the base station the new resources to be used for the transmission of the remaining data, for example by automatically sending a buffer status report. The signaling may also be triggered using the MAC layer. The UE may determine the new transmit resource pool or set by recalculating the zone ID formula described above based on its new coordinates.

Advantageously, only UEs, which are in mode 3 and which have an active SPS transmission, send the additional BSR to the BS on a zone change. No such signaling may be needed for other UEs.

In some of the embodiments described above, reference has been made to respective vehicles being either in the connected mode, also referred to as mode 3 configuration, or vehicles being in the idle mode, also referred to as mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, scheduling the resources in accordance with the aspects described above is advantageous as it allows for a more efficient scheduling of resources for sidelink communication avoiding resource collisions and the like.

Some embodiments of the present invention have been described above with reference to a communication system in which the transmitter is a base station serving a user equipment, and in which the receiver is the user equipment served by the base station. However, the present invention is not limited to such embodiments and may also be implemented in a communication system in which the transmitter is a user equipment, and in which the receiver is the base station serving the user equipment. In accordance with other embodiments, the receiver and the transmitter may both be UEs communicating directly with each other, e.g., via a sidelink interface.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 15:
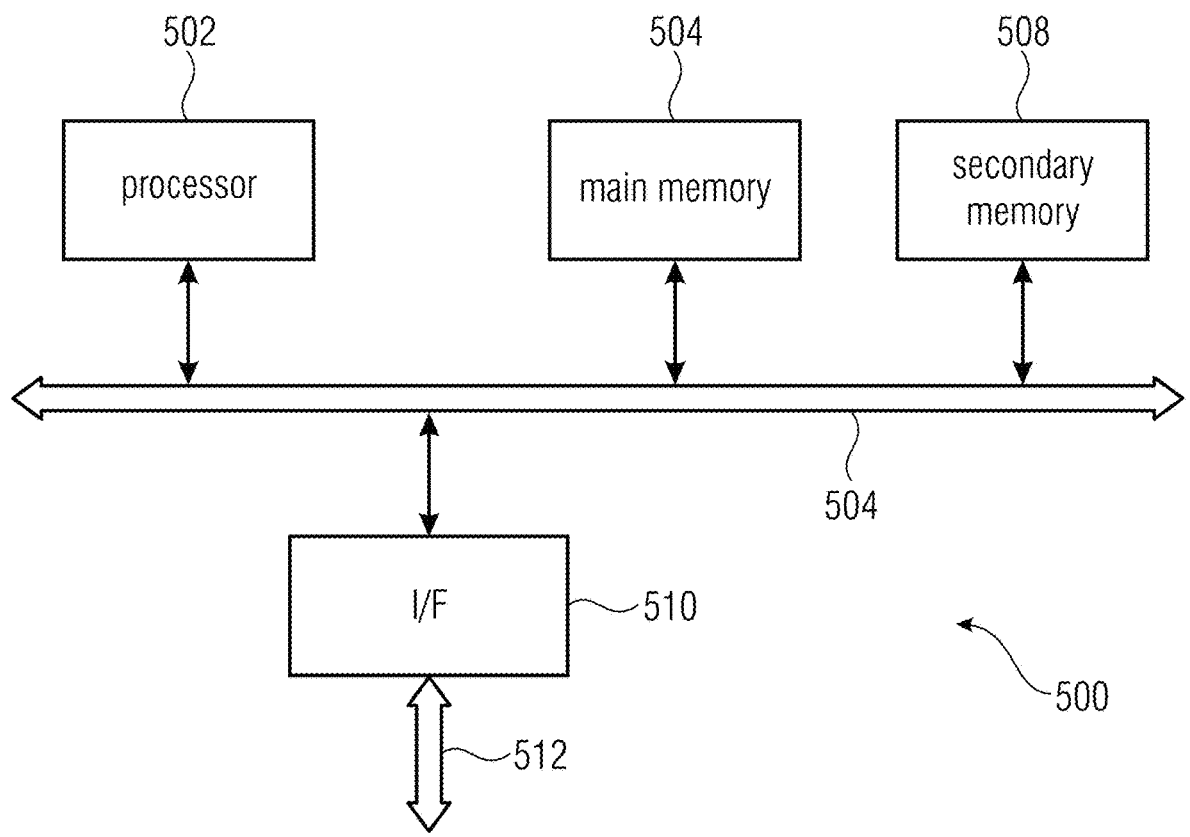
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| List of Acronyms and Symbols | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Subcarrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |

We claim:

1. A user equipment, UE, for a wireless communication system, the wireless communication system providing a resource set, the resource set comprising a plurality of resources to be allocated for respective transmissions in the wireless communication system, wherein
the UE is served by a base station of the wireless communication system,
the UE communicates with the base station and/or with one or more further UEs of the wireless communication system using resources from the resource set,
the resource set comprises a plurality of subcarriers in the frequency domain and a plurality of symbols in the time domain, the resource set comprising at least one bandwidth parts,
a plurality of resource pools are defined within the bandwidth part, the plurality of resource pools comprising at least a first resource pool and a second resource pool, wherein the first resource pool is a resource pool comprising resources to be used for transmitting and/or for receiving, and wherein the second resource pool is a resource pool comprising resources to be used for transmitting and/or for receiving;
the bandwidth part comprises a control channel for each resource pool for handling control messages and scheduling assignment messages, the control messages pointing to data to be transmitted inside the respective resource pool, and
UE is configured by the base station with the resources from one or more of the plurality of bandwidth parts to be used for the communication with the base station and/or with the one or more further UEs.

2. The user equipment, UE, of claim 1, wherein the UE is configured to receive a configuration message and/or configured by a stored pre-configuration in the out-of-coverage case, the configuration message and/or the stored pre-configuration defining the plurality of bandwidth parts across the resource set.

3. The user equipment, UE, of claim 1, wherein the UE is configured to receive a signaling indicating an activation or deactivation of one or more of the bandwidth parts.

4. The user equipment, UE, of claim 1, wherein, in case only a single bandwidth part is activated, the single bandwidth part comprises a control channel UE-specific search space control channel with a common search space so as to allow the UE to handle at the same time unicast or multicast communications and broadcast communications using the single bandwidth part.

5. The user equipment, UE, of claim 1, wherein, in case at least a first bandwidth part and a second bandwidth part are activated, the first bandwidth part comprises at least a control channel UE-specific search space, and the second bandwidth part comprises at least a control channel with a common search space, so as to allow the UE to handle at the same time unicast communications and broadcast communications using the first and second bandwidth parts.

6. The user equipment, UE, of claim 1, wherein, in case at least a first bandwidth part and a second bandwidth part are activated, the first bandwidth part comprises at least a control channel UE-specific search space, and/or a control channel with a common search space, and the second bandwidth part comprises at least a control channel with a UE-specific search space and/or a control channel with a common search space, so as to allow the UE to handle at the same time unicast communications and broadcast communications using the first and second bandwidth parts.

7. The user equipment, UE, of claim 1, wherein a control channel is defined by resources of only one of the bandwidth parts.

8. The user equipment, UE, of claim 1, wherein one of the bandwidth parts is a default bandwidth part where resource allocations for one or more services are send, wherein the control resources are either configured by the wireless communication system or pre-configured in the UE, the default bandwidth part comprising at least one control resource set, CORESET, with a common search space, CSS, so as to allow the UE to listen to the one or more services in the UE's vicinity.

9. The user equipment, UE, of claim 1, wherein the control channel in the default bandwidth part points to another control channel in another bandwidth part where an actual transmission takes place, so as to make other UEs aware that there is another bandwidth part with specific control resources that are to be monitored and/or decoded by the UE.

10. The user equipment, UE, of claim 1, wherein the control channel in the default bandwidth part points to another data channel in another bandwidth part, and wherein the UE automatically switches back to the default bandwidth part after a transmission of data, or a timeout in the second bandwidth part, or responsive to a control signaling.

11. A method for operating a user equipment, UE, of a wireless communication system, the wireless communication system providing a resource set, the resource set comprising a plurality of resources to be allocated for respective transmissions in the wireless communication system, the method comprising:
serving the UE by a base station of the wireless communication system
using resources from the resource set for a communication of the UE with the base station and/or with one or more further UEs of the wireless communication system, wherein
the resource set comprises a plurality of subcarriers in a frequency domain and a plurality of symbols in a time domain, the resource set comprising at least one bandwidth part, a plurality of resource pools are defined within the bandwidth part, the plurality of resource pools comprising at least a first resource pool and a second resource pool, wherein the first resource pool is a resource pool comprising resources to be used for transmitting and/or for receiving, and wherein the second resource pool is a resource pool comprising resources to be used for transmitting and/or for receiving, the bandwidth part comprises a control channel for each resource pool for handling control messages and scheduling assignment messages, the control messages pointing to data to be transmitted inside the respective resource pool, and the method comprises configuring the UE, by the base station, with the resources from one or more of the plurality of resource pools to be used for the communication with the base station and/or with the one or more further UEs.

12. The user equipment, UE, of claim 1, wherein the resource set comprises a plurality of bandwidth parts, the plurality of bandwidth parts comprising at least a first bandwidth part and a second bandwidth part, the first bandwidth part comprising a first bandwidth in the frequency domain, and the second bandwidth part comprising a second bandwidth in the frequency domain, the first bandwidth and the second bandwidth being different.

13. The user equipment, UE, of claim 1, wherein at least one of the plurality of bandwidth parts comprises a plurality of resource pools.

14. A base station for a wireless communication system, the wireless communication system providing a resource set, the resource set comprising a plurality of resources to be allocated for respective transmissions in the wireless communication system, wherein the base station serves one or more user equipments, UEs, of the wireless communication system, the resource set comprises a plurality of subcarriers in a frequency domain and a plurality of symbols in a time domain, the resource set comprising at least one bandwidth part, a plurality of resource pools are defined within the bandwidth part, the plurality of resource pools comprising at least a first resource pool and a second resource pool, wherein the first resource pool is a resource pool comprising resources to be used for transmitting and/or for receiving, and wherein the second resource pool is a resource pool comprising resources to be used for transmitting and/or for receiving;

the bandwidth part comprises a control channel for each resource pool for handling control messages and scheduling assignment messages, the control messages pointing to data to be transmitted inside the respective resource pool, and the base station configures the one or more UEs with resources from one or more of the plurality of resource pools to be used for a communication with the base station and/or with one or more further UEs.

* * * * *